(12) United States Patent
Chan et al.

(10) Patent No.: US 9,199,858 B2
(45) Date of Patent: Dec. 1, 2015

(54) METHODS FOR PRODUCING NANOPARTICLES USING PALLADIUM SALT AND USES THEREOF

(75) Inventors: Siu-Wai Chan, Demarest, NJ (US); Hongying Liang, Bronx, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 984 days.

(21) Appl. No.: 13/115,734

(22) Filed: May 25, 2011

(65) Prior Publication Data

US 2012/0028795 A1     Feb. 2, 2012

Related U.S. Application Data

(63) Continuation-in-part of application No. PCT/US2009/065935, filed on Nov. 25, 2009.

(60) Provisional application No. 61/118,248, filed on Nov. 26, 2008, provisional application No. 61/119,527, filed on Dec. 3, 2008, provisional application No. 61/121,508, filed on Dec. 10, 2008.

(51) Int. Cl.

| | | |
|---|---|---|
| *B01J 21/00* | (2006.01) | |
| *B01J 23/00* | (2006.01) | |
| *B01J 25/00* | (2006.01) | |
| *B01J 29/00* | (2006.01) | |
| *B01J 31/00* | (2006.01) | |
| *B01J 23/10* | (2006.01) | |
| *C01G 25/02* | (2006.01) | |
| *B01J 23/44* | (2006.01) | |
| *B01J 23/63* | (2006.01) | |
| *B01J 35/00* | (2006.01) | |

(Continued)

(52) U.S. Cl.
CPC .............. *C01G 25/02* (2013.01); *B01J 23/44* (2013.01); *B01J 23/63* (2013.01); *B01J 35/0013* (2013.01); *B82Y 30/00* (2013.01); *C01F 17/0018* (2013.01); *C01F 17/0043* (2013.01); *C01G 25/00* (2013.01); *C01G 55/00* (2013.01); *C01P 2002/54* (2013.01); *C01P 2002/72* (2013.01); *C01P 2004/04* (2013.01); *C01P 2004/64* (2013.01); *C01P 2004/82* (2013.01)

(58) Field of Classification Search
USPC ................................ 502/304, 100, 150, 300
See application file for complete search history.

(56) References Cited

U.S. PATENT DOCUMENTS

| | | |
|---|---|---|
| 4,996,180 A | 2/1991 | Diwell et al. |
| 5,496,417 A | 3/1996 | Farrugia et al. |

(Continued)

FOREIGN PATENT DOCUMENTS

| | | |
|---|---|---|
| WO | WO 2006/046153 | 5/2006 |
| WO | WO 2007/025793 | 3/2007 |

OTHER PUBLICATIONS

Crowell et al. (Hexamethylyenetetramine as a reagent for microscopic test for gold and the platinum metals), 1947.*

(Continued)

*Primary Examiner* — James McDonough
(74) *Attorney, Agent, or Firm* — Baker Botts L.L.P.

(57) ABSTRACT

The disclosed subject matter is directed to a method for producing nanoparticles, as well as the nanoparticles produced by this method. In one embodiment, the nanoparticles produced by the disclosed method have a high defect density.

3 Claims, 31 Drawing Sheets

(51) Int. Cl.
| | |
|---|---|
| B82Y 30/00 | (2011.01) |
| C01F 17/00 | (2006.01) |
| C01G 25/00 | (2006.01) |
| C01G 55/00 | (2006.01) |

(56) References Cited

U.S. PATENT DOCUMENTS

| | | | |
|---|---|---|---|
| 6,815,394 B2 | 11/2004 | Mori et al. | |
| 6,857,431 B2 | 2/2005 | Deevi et al. | |
| 6,930,068 B2 | 8/2005 | Kaneko et al. | |
| 7,141,227 B2 | 11/2006 | Chan | |
| 2005/0003744 A1 | 1/2005 | Feng et al. | |
| 2005/0031517 A1* | 2/2005 | Chan | 423/263 |
| 2006/0003457 A1 | 1/2006 | Porter et al. | |
| 2007/0249494 A1 | 10/2007 | Eyring et al. | |
| 2007/0258889 A1 | 11/2007 | Douglas et al. | |
| 2011/0258939 A1 | 10/2011 | Chan et al. | |

OTHER PUBLICATIONS

Zhu, et al., "Preparation of mesoporous copper cerium bimetal oxides with high performance for catalytic oxidation of carbon monoxide", *Applied Catalysis B: Environmental 81*, 81:236-243 (2008).

Zhang, et al., "Phase stability in ceria-zirconia binary oxide nanoparticles: The effect of the $Ce^{3+}$ concentration and the redox environment", *Journal of Applied Physics*, 99:084313-1-084313-8 (2006).

U.S. Appl. No. 13/087,211, Dec. 20, 2012 Response to Non-Final Office Action.

Benito, et al., "Zirconia supported catalysts for bioethanol steam reforming: Effect of active phase and zirconia structure", *Journal of Power Sources*, 169(1):167-176 (2007).

Bera, et al., "Structural investigation of combustion synthesized Cu/CeO2 catalysts by EXAFS and other physical techniques: Formation of a $Ce_{1-x}Cu_xO_{2-\delta}$ solid solution", *Chemistry of Materials*, 14(8):3591 (2002).

Berry, et al.,"A XANES study of Cu speciation in high-temperature brines using synthetic fluid inclusions", *American Mineralogist*, 91:1773-1782 (2006).

Chen, et al., "Surfactant-Controlled Synthesis of $Pd/Ce_{0.6}Zr_{0.4}O_2$ Catalyst for NO Reduction by CO with Excess Oxygen", *Applied Surface Science*, 243:319-328 (2005).

Cosentino, et al., "Lattice Parameters of Thoria-Yttri Solid Solutions", *Materials Letters*, 48(5):253-257 (2001).

Di Monte, et al., :*Journal of Materials Chemistry*, 15:633-648 (2005).

Fernandez-Garcia, et al., "New $Pd/Ce_xZr_{1-x}O_2/Al_2O_3$ Three-Way Catalysts Prepared by Microemulsion—Part 1. Characterization and Catalytic Behavior for CO Oxidation", *Applied Catalysis B: Enviromental*, 31(1):39-50 (2001).

U.S. Appl. No. 13/087,211, Jun. 20, 2012 Non-Final Office Action.

Freund, "Models for Oxidation Catalyst: Characterization and Reaction at the Atomic Level", *Catalysis Today*, 117(1-3):6-14 (2006).

Fu, et al., "Active Nonmetallic Au and Pt Species on Ceria-Based Water-Gas shift Catalysts", *Science*, 301(5635):935-938 (2003).

Fu, et al., "Activity and stability of low-content gold-cerium oxide catalysts for the water-gas shift reaction",*Applied Catalysis B*, 56(2005):57-68 (2005).

Gamarra, et al., "Structure-activity relationship in nanostructured copper-ceria based preferential CO oxidation catalysts", *Journal of Physical Chemistry C*, 111(29):11026-11038 (2007).

Groza, et al., "Principles of Particle Selection for Dispersion Strenghened Copper", *Materials Science and Engineering A*, A171(1-2):115-125 (1993).

Hassanzadeh-Tabrizi, et al., "Reverse Precipitation Synthesis and Characterization of CeO2 Nanopwder", *Journal of Alloys and Compounds*, 491(1):499-502 (2010).

Heck, et al., Catalytic Air Pollution Control: Commercial Technology (2nd Ed.), *Wiley-Interscience*, Table of Contents (2002).

Heun, et al., "Local interface composition and extended defect density in ZnSe/GaAs(001) and $ZnSe/In_{0.04}Ga_{0.96}As(001)$ heterojuctions", *Journal of Vacuum Science & Technology B*, 15(4):1279-1285 (1997).

Iglesias-Juez, et al., "Influence of the nature of the Ce-promoter on the behavior of Pd and Pd-Cr TWC systems", *Applied Catalysis A: General*, 259(2):207-220 (2004).

International Search Report and Written Opinion for PCT/US2009/065935, dated Jan. 21, 2010.

International Search report and Written Opinion for PCT/US2009/060884, dated Dec. 23, 2009 (Corresponds to U.S. Appl. No. 13/087,211).

Kikuchi, et al.,"Local surface modification of aluminum by laser irradiation", *Electrochim. Acta*, 47:225 (2001).

Kim, et al., "Lattice parameters, ionic conductivities, and solubility limits in flourite-structure $MO_2$ Ocide (M= $Hf^{4+}$, $Zr^{4+}$, $Ce^{4+}$, $Th^{4+}$, $U^{4+}$) solid solutions", *Journal of the American Ceramic Society*, 72(8):1415-1421 (1989).

Knauth, et al.,"Emf measurements of nanocrystalline copper-doped ceria", *Journal of Solid State Chemistry*, 140(2):295-299 (1998).

Lu, et al., "Cubic Phase Stabilization in Nanoparticles of Hafnia-Zirconia Oxides: Particle-Size and Annealing Enviroment Effects", *Journal of Applied Physics*, 103(12):124303/1-7 (2008).

Lu, et al., "Size-dependent ordering and curie temperatures of FePt nanoparticles", *Journal of Applied Physics*, 103(12):123526/1-4 (2008).

Mogensen, et al., "Physical, Chemical and Electrochemical Properties of Pure and doped Ceria", *Solid State Ionics*, 129(1-4):63-94 (2000).

Monteiro, et al., "The Role of Pd Precursors in the Oxidation of Carbon Monoxide over $Pd/Al_2O_3$ and $Pd/CeO_2/Al_2O_3$ Catalysts", *Catalysis Today*, 65(1):77-89 (2001).

Nguyen, et al., "Modeling of Extended Defects in the Vanadium Phosphate Catalyst for Butane Oxidation, $(VO)_2P_2O_7$", *Journal of Solid State Chemistry*, 122(2):259-265 (1996).

Overbury, et al., XANES Studies of the reduction Behavior of $(Ce_{1-y}Zr_y)O_2$ and $RH/(Ce_{1-y}Zr_y)O_2$, *Catalysis Letters*, 51:133-138 (1998).

Palkar, et al., "Size-induced structural transitions in the Cu-O and Ce-O systems", *Physical Review B (Condensed Matter)*, 53(5):2167-2170 (1996).

Perebeinos, et al., 'Madelung Model'Prediction for Dependence of Lattice Parameter on nanocrystal Size, *Solid State Communications*, 123(6-7):295-297 (2002).

Pike, et al., "Formation of stable $Cu_2O$ from reduction of CuO nanoparticles" *Applied Catalysis A: General*, 303(2):273-277 (2006).

Pitcher, et al., "Energy crossovers in nanocrystalline zirconia", *Journal of the American Ceramic society*, 88(1):160-167 (2005).

Qi, et al., "Activity and Stability of $Cu-CeO_2$ Catalysts in High-Temperature Water-Gas Shift for Fuel-Cell Applications", *Industrial Engineering Chemistry Research*, 43(12):3055-3062 (2004).

Rodriguez, et al., *Angewandte Chemie*, 46:1329-1332 (2007).

Ruh, et al., "The system zirconia-hafnia", *Journal of the American Ceramic Society*, 51(1):23-28 (1968).

Sadykov, et al., "Role of Defect Structure in Structural Sensitivity of the Oxidation Reactions Catalyzed by Dispersed Transition Metal Oxides", *Journal of Molecular Catalysis A: Chemical*, 158(1):361-365 (2000).

Shannon, R.D., "Revised Effective Ionic Radii and Systematic Studies of Interatomic Distances in Halides and Chalcogenides", *Acta Crystallographica Section A*, A32,:751-767 (1976).

Sherril, et al., "Adsorption and Reaction of Acrolein on Titanium Oxide Single Crystal Surfaces: Coupling Versus Condensation", *Catalysis Today*, 85(2-4):321-331 (Oct. 15, 2003).

Si, et al., "Novel Synthesis of Nanoscale Ceria and Gold-Doped Ceria", *North American Catalysis Society, 20th North American Meeting*, Jun. 17-21, 2007, p. 1 (O-S13-08).

Si, et al.,"Enhanced thermal stability and oxygen storage capacity for $Ce_xZr_{1-x}O_2$ ($\chi^{-0.4-.06}$) solid solutions by hydrothermally homogenous doping of trivalen rare earths", *Journal of Physical Chemistry C*, 111(2):787-794 (2002).

(56) References Cited

OTHER PUBLICATIONS

Smith, et al., "Summary Abstract: Adsorption and Reaction of $SO_2$ on titanium Oxide Surfaces", *Journal of Vacuum Science & Technology A (Vacuum, Surfaces, and Films)*, 5(4):689-690 (1987).

Somorjai, et al., "Frintiers of surface science", *Physics Today*, 60(10):48-53 (2007).

Sun, et al., "Noble metal water gas shift catalysis: Kinetics study and reactor design", *International Journal of Hydrogen Energy*, 30(11):1259-1264 (2005).

Tschope, et al., "Interface defect chemistry and effective conductivity in polycrystalline cerium oxide", *Journal of Electroceramics*, 14:5-23 (2005).

Tschope, et al., "Redox properties of nanocrystalline Cu-Doped cerium oxide studied by isothermal gravimetric analysis and x-ray photoelectron spectroscopy", *J. Phys. Cehm, B*, 103:8858-8863 (1999).

Wang, et al., "In situ studies of the active sites for the water gas shift reaction over $Cu-CeO_2$ catalysts: Complex interaction between metallic copper and oxygen vacancies of ceria", *Journal of Physical Chemistry B*, 110(1):428-434 (2006).

Wang, et al., "Unusual physical and chemical properties of Cu in $Ce_{1-x}Cu_xO_2$ oxides", *Journal of Physical Chemistry B*, 109(42):19595-19603 (2005).

Wen, et al., "*In situ* time-resolved characterization of novel $Cu-MoO_2$ catalysts during the water-gas shift reaction", *Catalysis Letters*, 113(1-2):1-6 (2007).

Whalstrom, et al., Bonding of Gold nanoclusters to Oxygen Vacancies on Rutile $TiO_2$ (110), *Physical Review Letters*, 90(2):026101/1-026101/4 (2003).

Wolf, et al., "Ion Impantation and catalysis: Electrochemical Applications of Ion Implantation", *Nuclear Instruments and Methods*, 182-183(Pt.2):875-885 (1981).

Zhang, et al., "Cerium Oxide Nanoparticles: Size-Selective Formation and Structure Analysis", *Applied Physics Letters*, 80(1):127-129 (2002).

Zhang, et al., "Ceria Nanoparticles: Size, Size Distribution, and Shape", *Journal of Applied Physics*, 95(8):4319-4326 (2004).

Zhang, et al., "Comparative Study of Cerium Oxidation State in Ceria Nanoparticles Using X-Ray Photoelectron Spectroscopy and X-Ray Absorption Near Edge Spectroscopy", *Surface Science*, 563(1-3):74-82 (2004).

Zhang, et al., "Synthesis and redox behavior of nanocrystalline hausmannite ($Mn_3O_4$)" *Chemistry Materials*, 19(23):5609-5616 (2006).

Zhang, et al., "In situ study of the crystallization from amorphous to cubic zirconium oxide: rietveld and reverse Monte Carlo analyses", *Chemistry of Materials*, 19(13):3118-3126 (2007).

Zhu, et al., "Preparation of Mesoporous Copper Cerium Bimetal Oxides with High Performance for Catalytic Oxidation of Carbon monoxide", *Applied Catalysis B:Enviromental*, 81:236-243 (2008).

U.S. Appl. No. 13/087,211, Mar. 22, 2013 Final Office Action.

\* cited by examiner

Preparation of 0.5% Pd-ceria at 85°C

| Precursor Pd atom% Pd-CeO$_2$ | Reaction time (hrs) | Supernatant color[a] | Yield % | Particle size(nm)[b] |
|---|---|---|---|---|
| 0.5 | 1.5 | No color & clear | 71.5 | 9.9 |
| 0.5 | 2 | No color & clear | 81.5 | 10.5 |
| 0.5 | 2.5 | No color & clear | 91.9 | 10.7 |
| 0.5 | 3 | No color & clear | 97.1 | 10.6 |

[a] The color of the supernatant in the centrifuge bottles after centrifugation.
[b] Determined by CeO$_2$ (111) peak

FIG.2

Summary of calcined Pd-CeO$_2$

| Precursor Pd at% Pd-CeO$_2$ | Sample color (calcined) | ICP Pd at% Pd-CeO$_2$ | Particle size(nm)[a] | Lattice parameter |
|---|---|---|---|---|
| 0.5 | | 0.4 | 11 | 5.4158±0.0004 |
| 1 | | 0.9 | 10 | 5.4162±0.0004 |
| 2 | | 2.5 | 9 | 5.4172±0.0005 |
| 4 | | 5.6 | 8 | 5.4180±0.001 |
| 8 | | 13.4 | 6 | 5.4200±0.003 |

[a] Determined by CeO$_2$ (111) peak.
All samples were calcined at 350°C for 4 hrs.

FIG. 4

| Precursor Pd atom% Pd-CeO$_2$ | Supernatant color [a] | Sample color | Particle size (nm) [b] | Lattice parameter (Å) |
|---|---|---|---|---|
| 1 | No color & clear | | 8 | 5.4238 |
| 2 | No color & clear | | 6 | 5.4210 |
| 8 | Light yellow & clear | | 5 | 5.4182 |

[a] supernatant color after centrifugation
[b] determined by CeO$_2$ (111) peak

FIG.5

XRD data of uncalcined nanoparticles of 13.4% Pd-CeO2 and palladium metal and standard powder diffraction data of Pd, PdO, hexamethylenetetramine or HMT, and CeO2.

The standards are from the International Centre for Diffraction Data (I.C.D.D.), and the values in parentheses are I.C.D.D. database codes.

| Precursor Zr (mol%) | Actual[c] Zr (mol%) | T (°C) | reaction time (hrs) | Calcining temperature (°C)/time (hrs) | Particle size[d] (nm) | Particle size[d,e] (nm) after 5 hrs @ 1000°C |
|---|---|---|---|---|---|---|
| 38 | 59 | RT | 22 | 500/5 | 4 | phase separation |
|  |  |  |  | 800/0.5 | 5 | phase separation |
| 25 | 39 | RT | 22 | 500/5 | 4 | 26.6 |
|  |  |  |  | 800/0.5 | 6 | 28.3 |
| 25[a] | 39 | RT | 47 | 500/5 | 5 | 29.8 |
| 17 | 25 | RT | 22 | 500/5 | 5 | 40.9 |
| 17[b] | 25 | RT | 22 | 500/5 | 5 | 34.1 |

[a] Co-precipitated with 1 atom % Pd.
[b] Co-precipitated with 1 weight % Pd.
[c] Estimated with previous ICP results.
[d] Determined by $CeO_2$ (111) peak.
[e] Second calcination.

FIG. 20

Raman spectra of calcined Pd-CeO$_2$

The 465cm$^{-1}$ F$_{2g}$ mode of the fluorite structure shifts to lower frequency, broadens, and becomes asymmetric indicate the O-vacancy concentration increases. 640cm$^{-1}$ peak is attributed to B1g vibration mode of PdO.

465cm$^{-1}$ is the F$_{2g}$ vibration of crystallite CeO$_2$. Broad band at 600cm$^{-1}$ is associate with oxygen vacancies. 830cm$^{-1}$ and 1120cm$^{-1}$ are attributed to peroxide (O$_2^{2-}{}_{ads}$) and superoxide (O$_2^{-}{}_{ads}$) species absorbed on the ceria surface, respectively. (*ChemPhysChem*, 7, 2006, 1957-1963)

Calculation of activation energy for coarsening (i.e., growth) in pure CeO2 and 5.6% Pd-CeO2: $\ln(d_f-d_i)$ as a function of $1/T$, where k is the rate constant and T is the absolute temperature, $d_f$ is the final grain size and $d_i$ is the initial grain size. The adjusted $R^2$ value for each of the linear fits is provided as well.

FIG. 31a
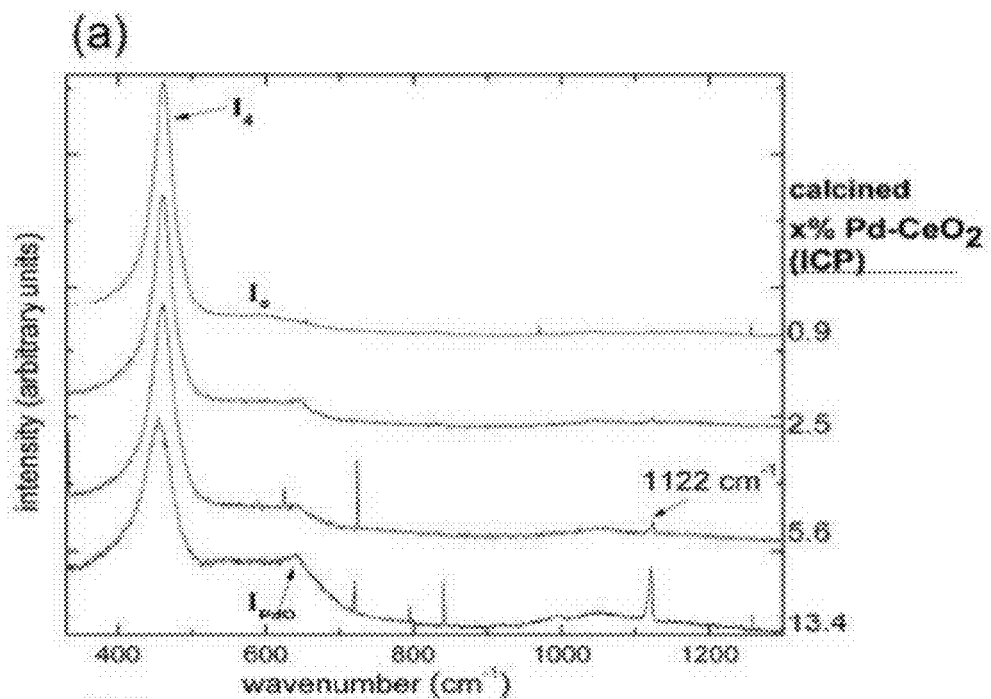
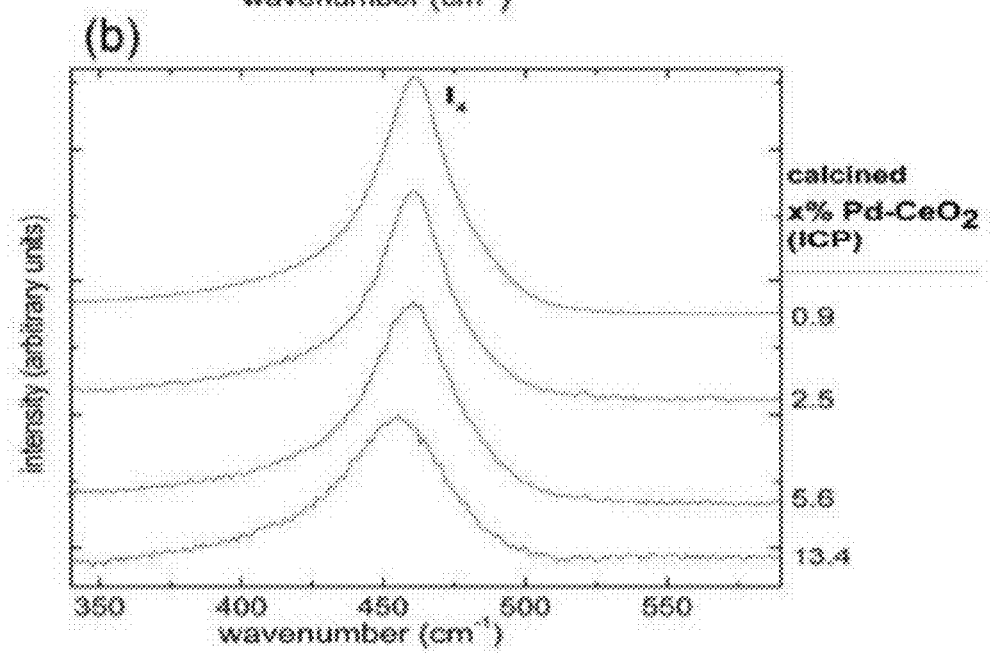
FIG. 31b

METHODS FOR PRODUCING NANOPARTICLES USING PALLADIUM SALT AND USES THEREOF

CROSS-REFERENCE TO RELATED APPLICATIONS

This application is a continuation-in-part of International application No. PCT/US2009/065935, filed on Nov. 25, 2009, which claims priority to U.S. Provisional Application Ser. No. 61/118,248, filed Nov. 26, 2008, U.S. Provisional Application Ser. No. 61/119,527, filed Dec. 3, 2008, and U.S. Provisional Application Ser. No. 61/121,508, filed Dec. 10, 2008, which are incorporated herein by reference in their entireties.

STATEMENT REGARDING FEDERALLY SPONSORED RESEARCH OR DEVELOPMENT

This invention was made with government support under Award No. DMR-0213574 awarded by the National Science Foundation and Grant No. DOE DE-FG02-05ER15730 awarded by the Department of Energy. The government has certain rights in the invention.

BACKGROUND

1. Technical Field

The disclosed subject matter is directed towards a process for producing nanoparticles using palladium salt and uses of these nanoparticles.

2. Background Art

Catalysis based on cerium oxide is used as an effective oxidation system in several environmental applications. Cerium oxide was introduced into the catalysis field in 1976, and not initially as a catalyst. Rather, it was chosen as the key oxygen storage component of the three-way catalyst used in automotive exhausts.

Accordingly, cerium oxide is used to extend the air/fuel ratio in the exhaust gas, releasing or accepting oxygen, respectively, under fuel-rich or fuel-lean conditions. This ensures that the noble metal catalyst operates at the desirable stoichiometric air/fuel ratio, at which it effectively converts all three gaseous pollutants (CO, hydrocarbons (HC), and NO) to innocuous products. A solid solution of cerium and zirconium oxides is used in today's catalytic converters as a material with higher oxygen storage capacity than pure ceria. In the years that followed the introduction of ceria into the catalytic converter, many additional merits of cerium oxide were realized, initially as an active catalytic component of the three-way catalyst, and subsequently as a catalyst and sorbent in various industrial applications.

Ceria has been found to be superior to alumina as a noble metal (NM) support, drastically improving the low-temperature activity of the NM for CO oxidation, NO reduction, and the water-gas shift reaction. The enhanced activity of these catalysts has been attributed to a synergistic redox reaction mechanism. Metal-modified cerium oxide has a higher oxygen storage capacity and reducibility than pure ceria. Here, oxygen species, oxygen vacancies, and their mobilities can be greatly modified by added metal species.

Among the precious metals used in the catalytic converter (Pt, Rh, and Pd), palladium is the most cost effective metal of the three. Any improvement in the usage of Pd will improve the cost-base of the present three-way catalyst and possibly diesel engine exhaust clean-up systems.

SUMMARY

In one aspect, the present disclosure provides methods for producing nanoparticles comprising combining a solution comprising hexamethylenetetramine (HMT), e.g., having concentration from between about 0.1M to about 1.5M, or about 0.5 M, with a solution comprising a palladium salt mixture, to form a combined aqueous solution; and mixing the combined aqueous solution to produce nanoparticles. The first and second aqueous solutions can be mixed separately, e.g., for a period of approximately 30 minutes. In other embodiments, the mixing time can be between about 10 minutes and about 2 hours. In one embodiment, the nanoparticles are high defect density nanoparticles.

In one embodiment, the palladium salt mixture includes palladium nitrate hydrate, palladium tetramine dinitrate, or palladium dichloride.

In one embodiment, the palladium salt mixture includes a cerium nitrate hexahydrate solution with palladium salt. For example, the cerium nitrate hexahydrate solution can have a concentration of about 0.0375 M. In other embodiments, the cerium nitrate hexahydrate solution can have a concentration between about 0.005M and about 0.1M.

In another embodiment, the palladium salt mixture includes a zirconium dichloride oxide octahydrate solution with palladium salt. For example, the zirconium dichloride oxide octahydrate solution can have a concentration of about 0.04 M. In other embodiments, the zirconium dichloride oxide octahydrate solution can have a concentration between about 0.005M and about 0.1M.

In still another embodiment, the palladium salt mixture includes a solution of cerium nitrate hexahydrate and zirconium dichloride oxide octahydrate with palladium salt. For example, the solution of cerium nitrate hexahydrate and zirconium dichloride oxide octahydrate can have a concentration of about 0.04 M. In other embodiments, the solution of cerium nitrate hexahydrate and zirconium dichloride oxide octahydrate can have a concentration between about 0.005M and about 0.1M.

In another aspect, the first aqueous solution comprises an HMT solution and the second aqueous solution comprises a noble metal support solution. The noble metal support solution can be, for example, a cerium nitrate hexahydrate solution, a zirconium dichloride oxide octahydrate solution, or a mixture of cerium nitrate hexahydrate and zirconium dichloride oxide octahydrate. The HMT solution and the noble metal support solution can be combined to form a preliminary aqueous solution. The palladium salt can then be added to the preliminary aqueous solution after heat has been applied, to form a combined aqueous solution. In one embodiment, the palladium salt can be added to the preliminary aqueous solution after the preliminary aqueous solution is heated for, e.g., 15 minutes after heating, to form a combined aqueous solution.

In one embodiment, the combined aqueous solution is maintained at room temperature and mixed. For example, the combined aqueous solution is mixed for at least between about 16 and about 72 hours. In another embodiment, the combined aqueous solution is mixed for at least about 22 hours.

Alternatively, the method includes heating the combined aqueous solution, e.g., after initial mixing. For example, the combined aqueous solution can be heated to approximately 85° C. In other embodiments, the reaction can occur between about 30° and about 85° C., or between about 48° C. and 85° C. For example, the combined aqueous solution can be heated and mixed for at least about three hours to about 22 hours, or about three to four hours. In still other embodiments, the combined aqueous solution can be heated and mixed for between about 3 hours and four hours.

In a further embodiment, the method includes collecting the nanoparticles from the combined aqueous solution by, e.g., centrifugation of the combined aqueous solution or filtration of the combined aqueous solution.

The present disclosure also provides for the use of the nanoparticles as a three-way catalyst or as a catalyst in a redox reaction, e.g., CO oxidation, steam reforming of methanol, water-gas shift (WGS), steam reforming of n-butane, methane oxidation, purifying methane containing waste gas, hydrogenation of furan to THF, and hydrogenation of 1-pentyne and 2-pentyne.

In addition, the present disclosure provides a nanoparticle as described herein, prepared by combining a solution comprising hexamethylenetetramine (HMT) and a solution comprising a palladium salt mixture to form a combined aqueous solution; and mixing the combined aqueous solution to produce a nanoparticle. In one embodiment, the combined aqueous solution is mixed at room temperature. For example, the combined aqueous solution is mixed for at least between about 16 and about 72 hours. In another embodiment, the combined aqueous solution is mixed for at least about 22 hours at room temperature.

Alternatively, the method includes heating the combined aqueous solution, e.g., after initial mixing. For example, the combined aqueous solution can be heated to approximately 85° C. In other embodiments, the reaction can occur between about 30° and about 85° C., or between about 48° C. and 85° C. For example, the combined aqueous solution can be heated and mixed for at least about three hours to about 22 hours, or about three to four hours. In still other embodiments, the combined aqueous solution can be mixed for between about 3 and four hours. In a related embodiment, after mixing, the heat can be removed, and the combined aqueous solution can be cooled.

BRIEF DESCRIPTION OF THE DRAWINGS

FIG. 2 shows experimental results detailing the change in the characteristics of the nanoparticulate product based on the reaction time for 0.5% ceria prepared at 85° C. according to one embodiment of the disclosed subject matter.

FIG. 4 shows experimental results detailing the change in the characteristics of the nanoparticulate product based on the concentration of Pd in the precursor solution for ceria prepared at 85° C. for three hours according to one embodiment of the disclosed subject matter.

FIG. 5 shows experimental results detailing the change in the characteristics of the nanoparticulate product based on the concentration of Pd in the precursor solution for ceria prepared at room temperature according to one embodiment of the disclosed subject matter.

FIG. 11 shows X-ray diffraction (XRD) data of xPd—$CeO_2$ precipitated at 85° C. according to one embodiment of the disclosed subject matter, where x is the atomic % Pd in the precursor solution.

FIG. 17 shows XRD data for $CeO_2$—$ZrO_2$ nanoparticles calcined at 800° C.

FIG. 18 shows XRD data for $CeO_2$—$ZrO_2$ nanoparticles of different compositions calcined at either 500° C. or 800° C.

FIG. 19 shows XRD data for $CeO_2$—$ZrO_2$ nanoparticles of different compositions calcined at either 800° C. for 30 minutes or 1000° C. for 5 hours.

FIG. 20 illustrates experimental results detailing the characteristics of the nanoparticles based on zirconium content in the precursor solution, reaction time, and calcining time and temperature.

FIG. 21 shows XRD data for xPd—$ZrO_2$ where x is the atomic % Pd in the precursor solution.

FIG. 22 shows X-ray Absorption Near Edge Structure (XANES) data taken at the Pd LIII edge for Pd—$CeO_2$ nanoparticles and Pd metal and $Pd^{2+}$ oxidation standards.

FIG. 25 shows close-ups of the Raman spectra of Pd—$CeO_2$ nanoparticles with varying palladium contents as shown in FIG. 25.

FIG. 26 shows the Raman spectra of 0.9% Pd—$CeO_2$ before and after calcinations.

FIG. 31 shows Raman spectra of Pd—$CeO_2$ nanoparticles with varying palladium contents. FIG. 31a shows the complete spectra. FIG. 31b shows a closeup of the primary peak.

DETAILED DESCRIPTION

Figure 1:
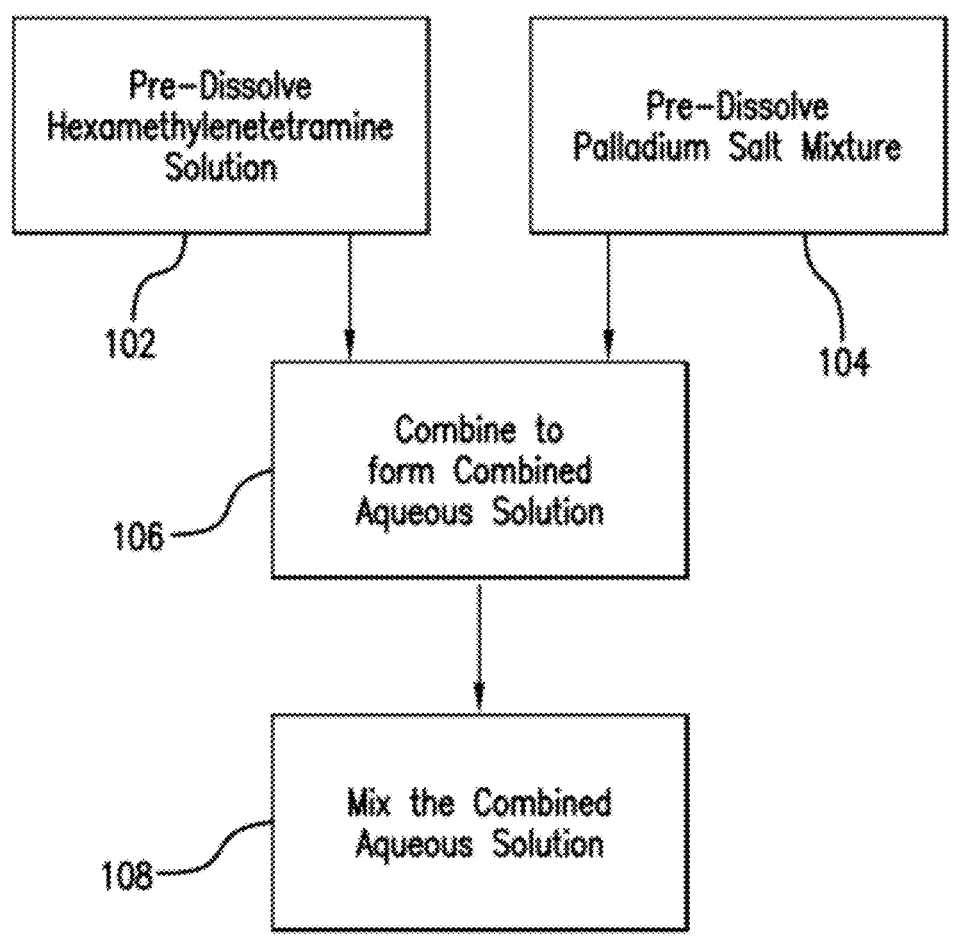
FIG. 1 illustrates one embodiment of the aqueous method for producing nanoparticles according to the disclosed subject matter.

The disclosed subject matter provides a method for producing nanoparticles using palladium salt. In one embodiment, the nanoparticles have a high defect density. The disclosed subject matter also provides nanoparticles produced by this method, and uses thereof. In one aspect, the method includes combining a solution comprising hexamethylenetetramine with a solution comprising a palladium salt mixture to form a combined aqueous solution. The combined aqueous solution is then mixed such that nanoparticles are produced.

In another embodiment, a solution comprising hexamethylenetetramine is combined with a noble metal support solution to form a preliminary aqueous solution. Palladium salt can then be added to the preliminary aqueous solution to form a combined aqueous solution. The combined aqueous solution is then mixed such that nanoparticles are produced.

Unless otherwise defined, all technical and scientific terms used herein have the same meanings as commonly understood by one of ordinary skill in the art to which the disclosed subject matter belongs. Although methods and materials similar or equivalent to those described herein can be used in its practice, suitable methods and materials are described below.

It is to be noted that the term "a" entity or "an" entity refers to one or more of that entity. As such, the terms "a", "an", "one or more", and "at least one" can be used interchangeably herein. The terms "comprising," "including," and "having" can also be used interchangeably. In addition, the terms "amount" and "level" are also interchangeable and can be used to describe a concentration or a specific quantity. Furthermore, the term "selected from the group consisting of" refers to one or more members of the group in the list that follows, including mixtures (i.e. combinations) of two or more members.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to +/−20%, preferably up to +/−10%, more preferably up to +/−5%, and more preferably still up to +/−1% of a given value. Alternatively, the term can mean within an order of magnitude, preferably within 5-fold, and more preferably within 2-fold, of a value.

Methodology

The present disclosure provides an aqueous method to produce nanoparticles, e.g. nanoparticles with a high defect density. The phrase "high defect density," as used herein, can refer to a single particle having some imperfection or disruption in its crystal structure, such as an extended discontinuity or an edge dislocation. In one embodiment, the planar defect density in a high defect density region of a nanoparticle is about $1 \times 10^7/cm^2$ or more, about $1 \times 10^8/cm^2$ or more, about $1 \times 10^9/cm^2$ or more, about $1 \times 10^{10}/cm^2$ or more, or about $1 \times 10^{13}/cm^2$ or more. High defect densities are also described in Heun, S. et al. *Journal of Vacuum Science & Technology B (Microelectronics and Nanometer Structures)*, 15(4), 1279-85 (1997), incorporated herein by reference.

"High defect density" can also refer to a composition comprising a percentage of particles having some imperfection or disruption in its crystal structure, such as an extended discontinuity or an edge dislocation. The percentage of defective particles can be proportional to the amount of palladium cations present in the sample.

The methods described herein allow for the preparation of nanoparticles having a high defect density at a low temperature. Therefore, the process does not require a large energy input. Furthermore, because the procedure is completely aqueous based, the costs of purchasing and disposing of organic solvents are avoided. Therefore, the disclosed methods are highly efficient and cost effective and do not require expensive equipment.

FIG. 1 illustrates an exemplary embodiment of the process for producing nanoparticles, which involves first providing two precursor aqueous solutions which are dissolved separately. In the embodiment described in FIG. 1, the first aqueous solution comprises hexamethylenetetramine (HMT) and the second aqueous solution comprises a palladium salt mixture. As used herein, palladium salt mixture can refer to a cerium nitrate hexahydrate ($Ce(NO_3)_3$-$6H_2O$) solution with palladium salt, a zirconium dichloride oxide octahydrate ($ZrOCl_2$-$8H_2O$) solution with palladium salt, or a mixture of cerium nitrate hexahydrate and zirconium dichloride oxide octahydrate with palladium salt. Palladium salt can be palladium nitrate hydrate ($Pd(NO_3)_2$-$xH_2O$), palladium tetramine dinitrate ($Pd(NH_3)_4(NO_3)_2$), or palladium dichloride ($PdCl_2$).

In 102 and 104 of FIG. 1, the first aqueous solution and the second aqueous solution are provided. In one embodiment, these aqueous solutions are mixed separately. For example, the solutions can be mechanically stirred. In another embodiment, the solutions can be mixed at room temperature. In one embodiment, the first aqueous solution can comprise a hexamethylenetetramine (HMT) solution and the second aqueous solution can comprise a palladium salt mixture.

In one embodiment, the HMT solution can have a concentration of about 0.5 M. In other embodiments, the HMT solution can have different concentrations. For example, the HMT solution can have a concentration between about 0.1M and about 1.5M.

The concentration of the palladium salt mixture can depend on the specific solution used. In one embodiment, the second aqueous solution can be a 0.0375M cerium nitrate hexahydrate solution with palladium salt. In other embodiments, the cerium nitrate hexahydrate solution can have a concentration between about 0.005M and about 0.1M.

In another embodiment, the second aqueous solution can be a 0.04M zirconium dichloride oxide octahydrate solution with palladium salt. In other embodiments, the zirconium dichloride oxide octahydrate solution can have a concentration between about 0.005M and about 0.1M.

In another embodiment, the second aqueous solution can be a mixture of cerium nitrate hexahydrate and zirconium dichloride oxide octahydrate with palladium salt. In other embodiments, the mixture can have a concentration between about 0.005M and about 0.1M. However, based on previous studies on different systems, but involving aqueous synthesis with HMT, the use of low concentrations could result in a smaller particle size (Lu, C.-H. et al. *Journal of Applied Physics,* 103(12), 124303/1-7 (2008)). In one embodiment, the palladium salt mixture has a palladium content of between about 0.2% and about 13%, between about 0.2% and about 8%, between about 0.2% and about 8%, or between about 0.2% and about 2%, inclusive of the upper and lower limits. The palladium content is the cation percentage (i.e., it does not include the oxygen).

The first and second aqueous solutions can be mixed separately, e.g., for a period of approximately 30 minutes. In other embodiments, the mixing time can be between about 10 minutes and about 2 hours, inclusive of the upper and lower limits.

The first and second aqueous solutions can then be combined to form a combined aqueous solution at room temperature 106 of FIG. 1. The combined aqueous solution can then be mixed at 108 of FIG. 1. The combined aqueous solution can be mixed at room temperature or can be heated while mixing.

In one embodiment, the combined aqueous solution is mixed for some period of time, e.g., approximately 15-30 minutes, and then, optionally, the combined aqueous solution is heated. The solution can be heated by adding the combined aqueous solution to a heated reaction vessel, such as, for example, a water-jacketed beaker heated with a NesLab EX Series bath/circulator. The combined aqueous solution can also be heated by any method known in the art, e.g., by heating in a water bath. In an exemplary embodiment, the combined aqueous solution is heated to approximately 60-85° Celsius. In other embodiments, the reaction can occur between about 30° and about 80° C., or between about 48° C. and about 85° C., inclusive of upper and lower limits. The combined aqueous solution can be mixed for a period of approximately 3-4 hours or between about 3 and about 22 hours, inclusive of the upper and lower limits. The reaction time can be longer at low temperatures. After a period of time, the product can be cooled. For example, the product can be cooled down in an ice box or by any other method known in the art.

In another embodiment, the HMT and palladium salt mixture can be mixed together at approximately room temperature for about 22 hours. In other embodiments, the combined aqueous solution can be mixed for between about 16 and about 72 hours at room temperature, inclusive of the upper and lower limits.

In another aspect, the first aqueous solution comprises an HMT solution and the second aqueous solution comprises a noble metal support solution. The noble metal support solution can be a cerium nitrate hexahydrate solution, a zirconium dichloride oxide octahydrate solution, or a mixture of cerium nitrate hexahydrate and zirconium dichloride oxide octahydrate. The HMT solution and the noble metal support solution can be combined to form a preliminary aqueous solution. The palladium salt can then be added to the preliminary aqueous solution after heat has been applied to form a combined aqueous solution. In one embodiment, the palladium salt can be added to the preliminary aqueous solution after the preliminary aqueous solution is heated, e.g., 15 minutes after heating.

In one embodiment, the nanoparticulate product can then be optionally collected. The product can be collected by any method known in the art, including but not limited to, centrifugation or filtration. Centrifugation can be accomplished by any method and with any tools known in the art, including, but not limited to, a Sorvall RC5B or RC5B+, operating around 12,000 rpm or higher. The time required for separation by centrifugation will be known by one of ordinary skill in the art, and is readily calculated from standard centrifugation equations for separating particles from a liquid suspension. Filtration can also be accomplished by any method or with any tools known in the art, including, but not limited to, submicron filter papers. Filtration can occur without the addition of any flocculating agents.

After the nanoparticulate product is collected, it can be allowed to dry in the air and, in one embodiment, ground with a mortar and pestle. The nanoparticulate product can then be calcined or annealed at approximately 350° C. for approximately four hours. In other embodiments, the nanoparticulate product can be calcined between 350° and 800° C. for between about 0.5 and about 4 hours, inclusive of the upper and lower limits. Calcination can have a large effect on the properties of the nanoparticles. Higher calcination temperatures, such as 800° C., can result in larger particle size. In addition, for $(1-x)CeO_2$-$xZrO_2$, if x>38%, calcination at 1000° C. for about 5 hours results in phase separation.

FIG. 2 illustrates experimental results detailing the change in the characteristics of the nanoparticulate product based on reaction time. The nanoparticulate product was prepared according to one embodiment of the disclosed subject matter, with only the reaction time being varied. In FIG. 2, the yield increases as the reaction is allowed to proceed for longer periods of time. Although a three hour reaction time can result in a higher yield, heating the combined aqueous solution for at least about 1.5 hours can produce the desired nanoparticles.

Nanoparticulate Product

The nanoparticulate product described in relation to FIG. 1 can be approximately 12 nm or less in diameter and uniform in size. However, the size of the nanoparticulate product can be affected by many factors, including the solutions used as reactants, the concentrations of the reactants, and the ratio of the cation concentration to the HMT concentration. The palladium content can be increased or decreased as desired, with the molarity palladium ranging from 0.2 to 13%.

Figure 3:
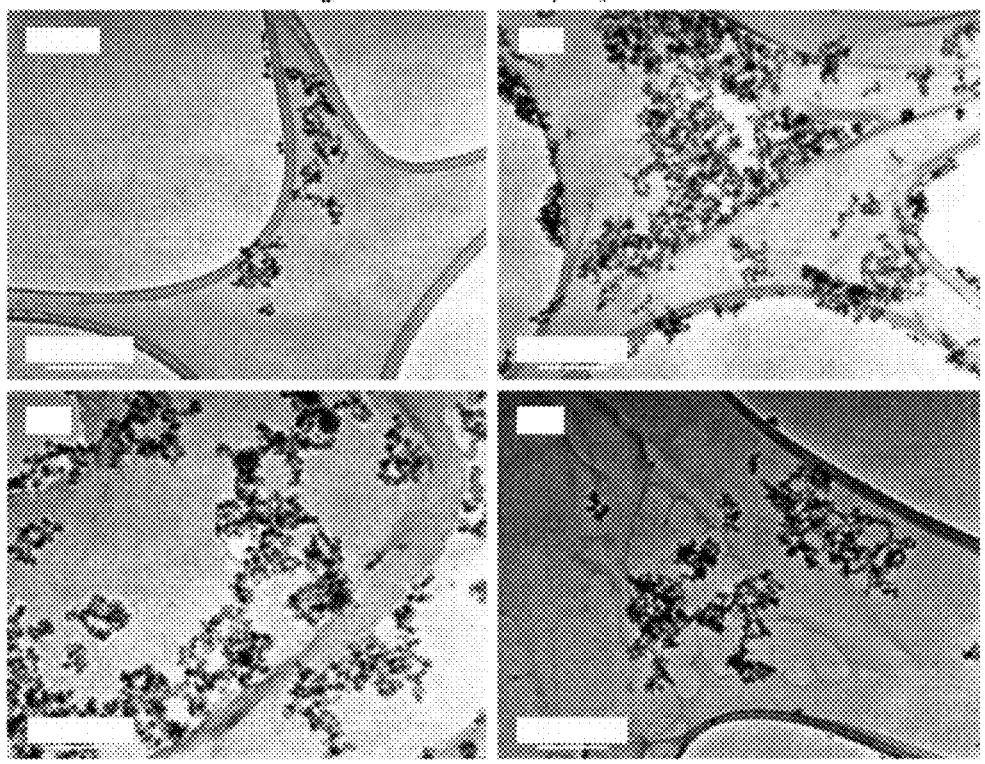
FIG. 3 shows transmission electron microscopy images of Pd-ceria prepared at 85° C. according to one embodiment of the disclosed subject matter. The images correspond to (clockwise from top left) 0.5% Pd-ceria, 1% Pd-ceria, 8% Pd-ceria, and 2% Pd-ceria.

FIG. 3 shows transmission electron microscopy (TEM) images of Pd-ceria prepared according to one embodiment of the disclosed subject matter. The samples were prepared at 85° C. The different samples show nanoparticles which were prepared with different amounts of Pd in the palladium salt mixture.

FIGS. 4 and 5 illustrate how a change in the preparation process can result in a change in the characteristics of the nanoparticles. FIG. 4 shows that changing the concentration of the Pd in the palladium salt can result in changes in sample color and particle size when the Pd-ceria is prepared at 85° C. FIG. 5 shows similar changes when the Pd-ceria is prepared at room temperature according to another embodiment of the disclosed subject matter. FIGS. 4 and 5 both indicate that particle size decreases with increased Pd concentration. A comparison of FIGS. 4 and 5 further reveals that different preparation temperatures can lead to differences in particle size and lattice parameter. For example, compare the size of the 1% Pd-ceria nanoparticles prepared at room temperature (7.8 nm) to the size of the Pd-ceria nanoparticles prepared at 85° C. (9.5 nm).

Figure 6A:
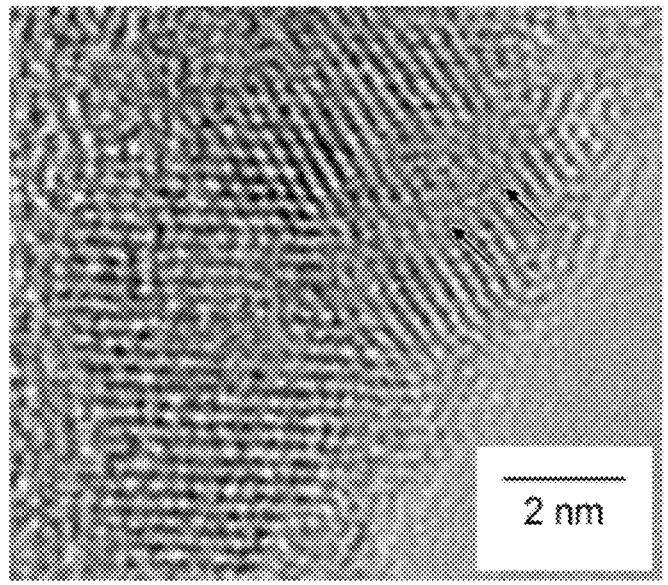
FIG. 6 illustrates high-resolution TEM images of 8% Pd-ceria nanoparticles prepared according to one embodiment of the disclosed subject matter. The arrows point to regions of extended discontinuities.
Figure 6B:
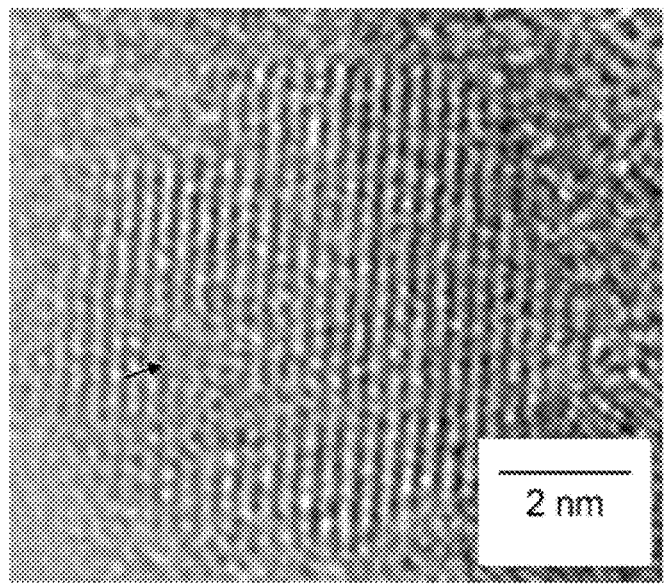

FIG. 6 shows high resolution transmission electron microscopy (HRTEM) images of 8% Pd-ceria prepared according to one embodiment of the disclosed subject matter. The high defect density nanoparticles can be characterized by an octahedral or truncated octahedral morphology and extended defects can be seen in many of the nanoparticles imaged with HRTEM. Defects can include edge dislocation and discontinuous lattice planes (discontinuity). For example, FIG. 6a shows a particle with an extended region of planar discontinuity, indicated with an arrow. Extended defects have distorted lattice sites that are differently strained either in compression or in tension. Such defects can provide energetically favorable lattice sites for Pd atoms or ions to reside. The anchored Pd atoms or ions will be more resistant against coarsening which is a known degradation mechanism for precious metal catalysts.

Figure 27:
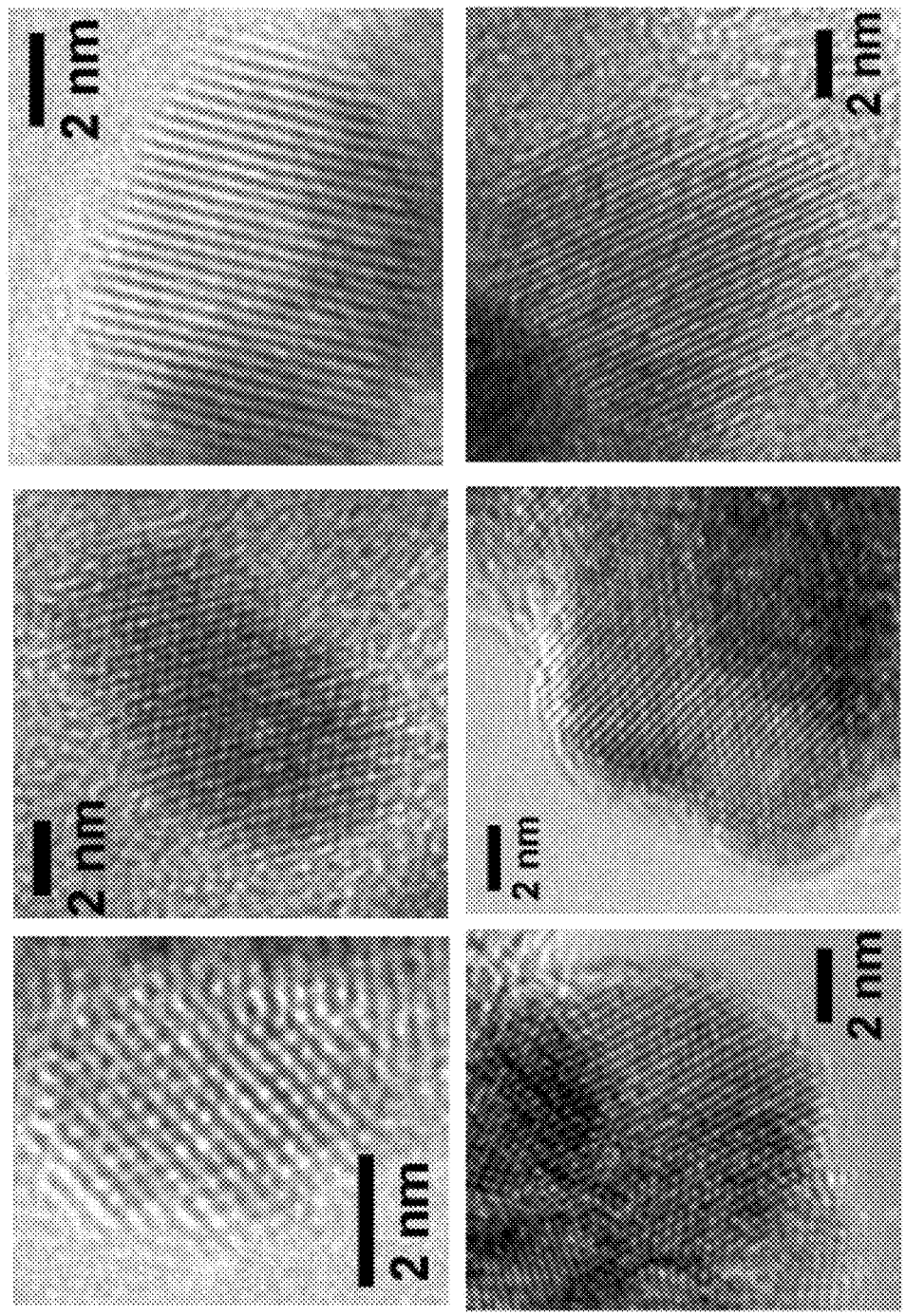
FIG. 27 shows HRTEM images of 0.9% Pd—$CeO_2$ prepared according to one embodiment of the disclosed subject matter.
Figure 28:
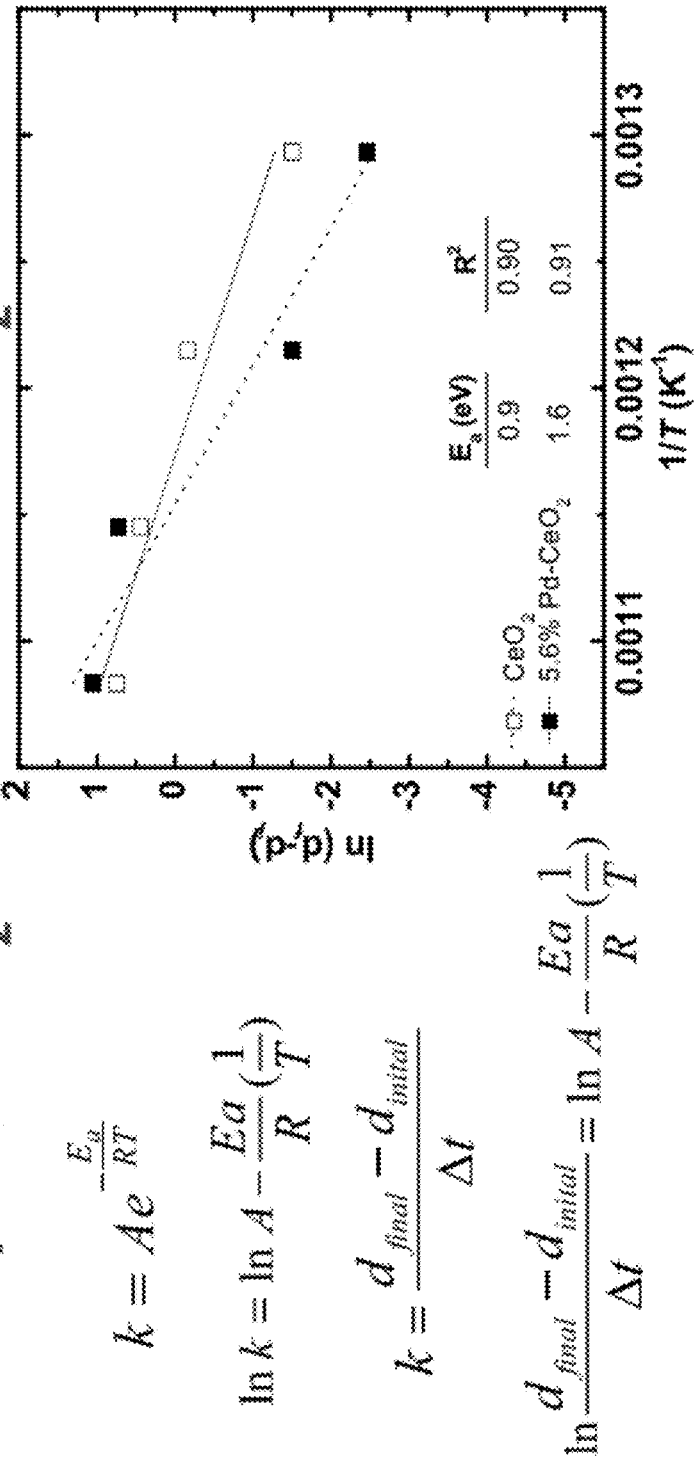
FIG. 28 shows coarsening activity energy of pure $CeO_2$ and 5.6% prepared according to one embodiment of the disclosed subject matter. The adjusted $R^2$ value for each of the linear fits is provided as well.

HRTEM images of 0.9% Pd—$CeO_2$ prepared according to another embodiment of the disclosed subject matter are shown in FIG. 27. The morphology of the calcined 0.9% Pd—$CeO_2$ nanoparticles is similar to those of pure ceria, being roughly octahedral in shape, but with rounded corners.

Contraction of the lattice evident with x-ray diffraction (XRD) suggests incorporation of palladium into the cubic fluorite lattice of cerium oxide, zirconium oxide, and cerium-zirconium oxide.

Uses for the Nanoparticles

The nanoparticles produced using the disclosed subject matter can be used for any application in which nanoparticles with significant extended defects or a high defect density are useful. For example, the nanoparticles can be used as catalysts in redox reactions. These redox reactions can include, but are not limited to, CO oxidation, steam reforming of methanol, water-gas shift (WGS), steam reforming of n-butane, methane oxidation, purifying methane containing waste gas, hydrogenation of furan to THF, and hydrogenation of 1-pentyne and 2-pentyne, or the reverse of these reactions.

Figure 7:
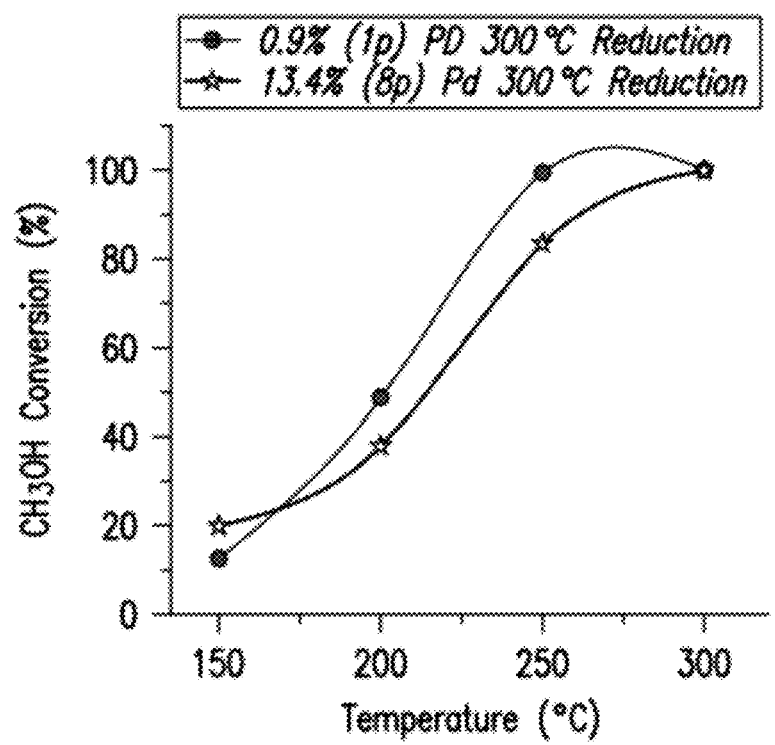
FIG. 7 shows the percentage of methanol conversion based on reaction temperature for Pd-ceria nanoparticles having different Pd content in a steam reforming of methanol reaction according to one embodiment of the disclosed subject matter. The palladium percentages were determined by inductively coupled plasma (ICP). The values in parentheses, followed by the letter "p", are the Pd percentages in the precursor solution.

Steam reforming of methanol is a reaction whereby methanol and water react to form carbon monoxide and hydrogen gas ($CH_3OH+H_2O \rightarrow CO_2+3H_2$). Pd-ceria nanoparticles can be used as a catalyst for this reaction. FIG. 7 shows the percentage of methanol that is converted based on the Pd content of the precursor solution and the reaction temperature. As shown, different Pd contents can cause differences in the performance of the reaction. The 1% Pd precursor solution performs better than the 8% Pd precursor solution over most of the temperature range. In one embodiment, the Pd precursor solution used as a catalyst in this reaction is less than about 4% Pd, or between about 0.2% Pd and 2% Pd.

Figure 8:
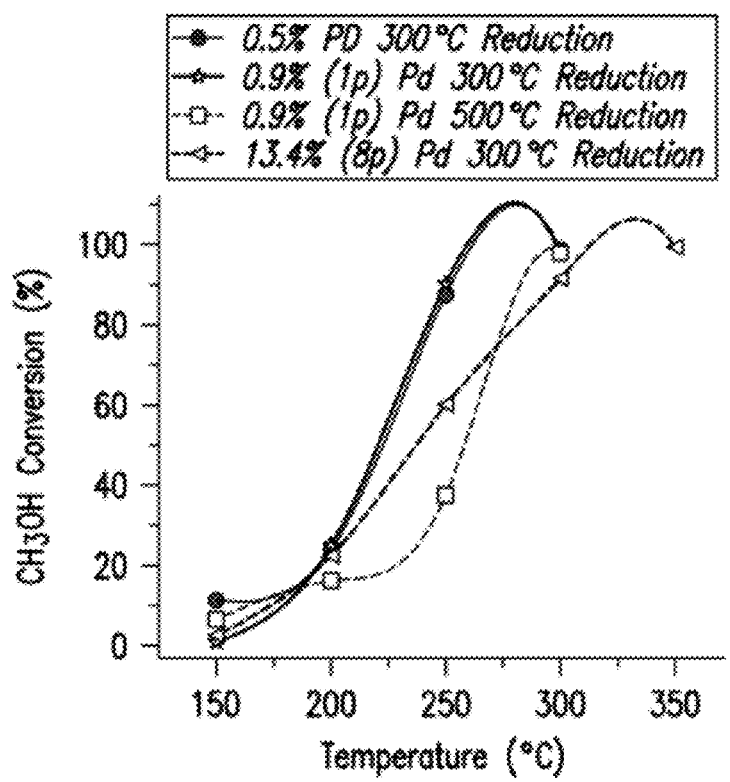
FIG. 8 shows the percentage of methanol conversion based on reaction temperature for a methanol decomposition reaction according to one embodiment of the disclosed subject matter. This conversion percentage is shown for nanoparticles having varying Pd contents and which were subjected to different reducing environment temperatures. The palladium percentages were determined by ICP. The values in parentheses, followed by the letter "p", are the Pd percentages in the precursor solution.
Figure 9:
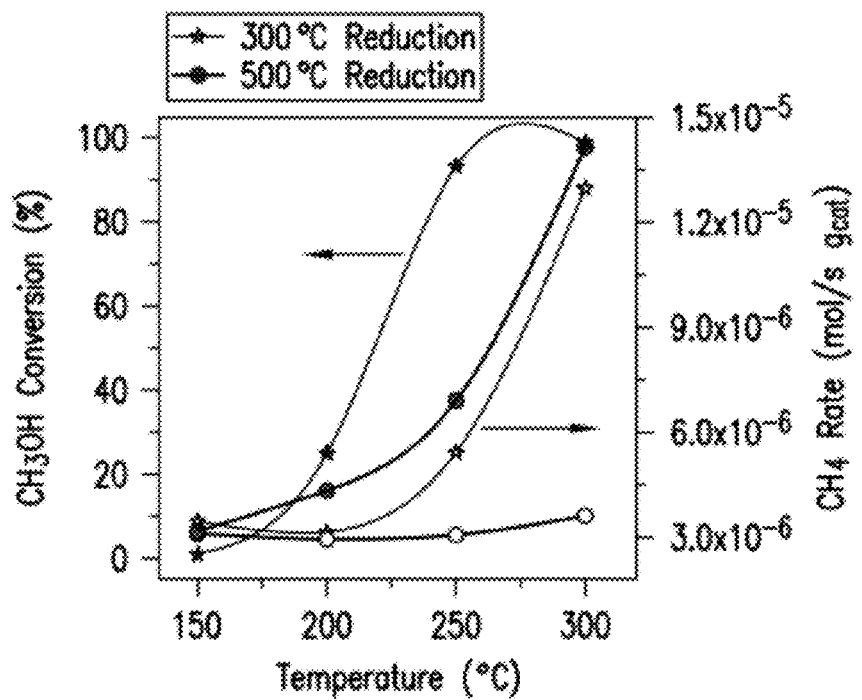
FIG. 9 shows the percentage of methanol conversion and $CH_4$ production rate based on reaction temperature for a methanol decomposition reaction according to one embodiment of the disclosed subject matter. The Pd-ceria samples both had 1% Pd in the precursor solution. However, the Pd-ceria samples were pre-reduced at 300° C. and 500° C. The palladium percentages were determined by ICP. The values in parentheses, followed by the letter "p", are the Pd percentages in the precursor solution.

The nanoparticles produced using the disclosed method can also be used as catalysts in the decomposition of methanol, which converts methanol into carbon monoxide and hydrogen gas ($CH_3OH \rightarrow CO+2H_2$). FIG. 8 shows the percentage of methanol conversion based on the reaction temperature for nanoparticles with different Pd contents and reducing environment temperatures. Different Pd contents can also cause differences in performance for the decomposition of methanol. Again, the 1% Pd precursor solution performs better than the 8% Pd precursor solution over most of the temperature range. In addition, FIG. 8 shows that differences in the reducing environment temperatures can cause differences in performance. A more detailed view of the differences between a 1% Pd precursor solution heated to 300° C. and a 1% Pd precursor solution heated to 500° C. is shown in FIG. 9. In one embodiment, the Pd precursor solution used as a catalyst in this reaction is less than about 4% Pd, or between about 0.2% Pd and 2% Pd.

The nanoparticles can be used as a three-way catalyst in automobile pollution abatement. Gasoline engines produce three major pollutants: hydrocarbons ($C_xH_y$), carbon monoxide (CO), and mono-nitrogen oxides ($NO_x$). Three-way catalysts convert pollutants to harmless gases. The nanoparticles produced using the method described herein can be used as a catalyst for these reactions.

Phase homogeneity is an important factor in redox behavior, because phase separation of Pd—$CeO_2$—$ZrO_2$ aging at high temperatures is a big problem for three-way catalysts. In one embodiment of the room temperature reaction according to the disclosed subject matter, a very homogeneous, single phase Pd—$CeO_2$—$ZrO_2$ can be obtained. When the zirconium reaches 38 atom % the samples still remain as a single phase even after aging at 1000 degrees Celsius for 5 hours in the air.

Figures 10A, 10B:
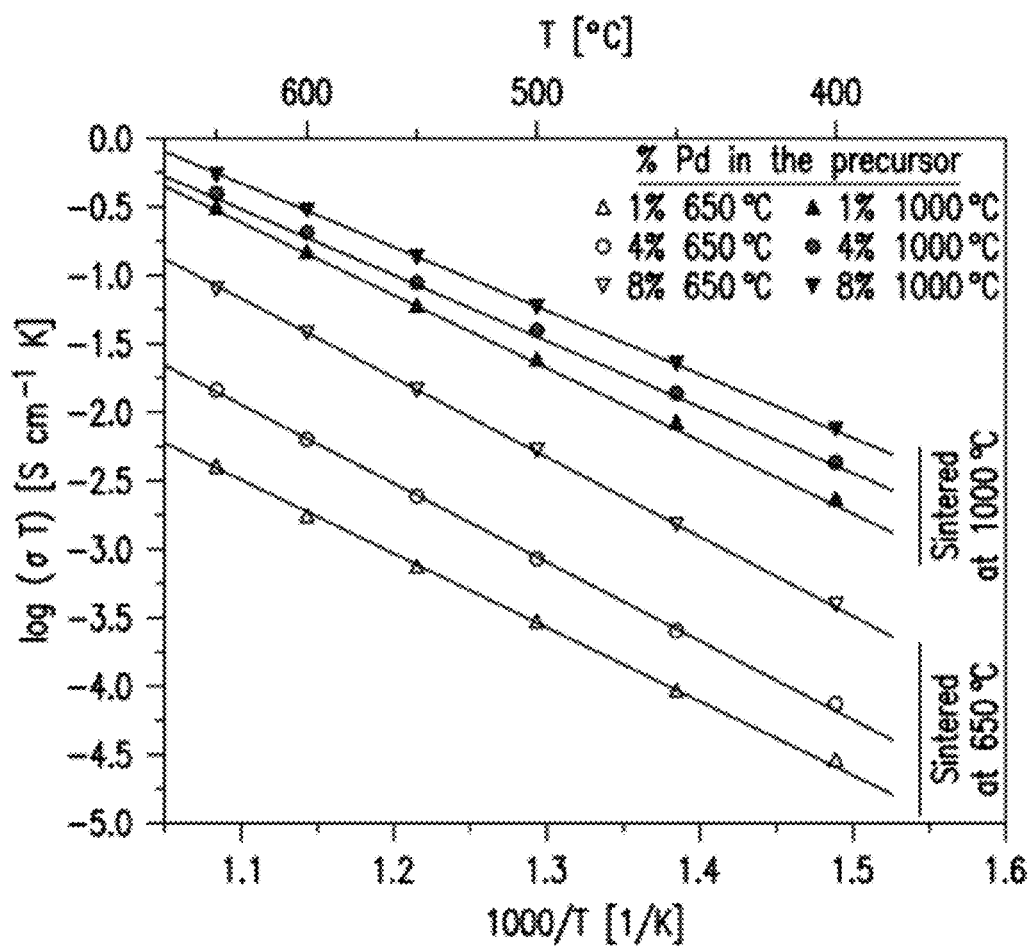
FIG. 10a shows the ionic conductivity of Pd—$CeO_2$ nanoparticles based on the Pd content of the precursor solution and the calcination temperature as determined by impedance spectroscopy, according to one embodiment of the disclosed subject matter.
FIG. 10b shows the activation energy for ionic conduction.

Pd—$CeO_2$ particles made in accordance with the disclosed subject matter can also be used in fuel cell applications. FIG. 10 shows that Pd—$CeO_2$ nanoparticles exhibit ionic conductivity. Ionic conductivity increases with an increase in palladium content. In addition, ionic conductivity increases with an increase in sintering or calcination temperature. Ionic conductors are of interest to fuel cell researchers because they can be used as the electrolyte in these cells.

EXAMPLE

Aqueous Co-Precipitation of Pd- and Cu-Doped Oxide Nanoparticles: Synthesis, Phase Stability and Aging Studies

Experimental

Nanoparticles of Pd- and Cu-doped oxides were prepared by aqueous co-precipitation. The palladium precursor was either palladium nitrate, $Pd(NO_3)_2.2H_2O$ (analytical grade, Fluka) or a $Pd(NH_3)_4(NO_3)_2$ solution with a 4.68% Pd content (BASF), and the copper precursor was copper (II) nitrate hemi(pentahydrate), $Cu(NO_3)_2.2.5H_2O$ (98%, Alfa Aesar). The concentration of palladium or copper used in the precursor varied depending on the desired final content.

For the ceria-based nanoparticles, a 0.375M cerium nitrate hexahydrate, $Ce(NO_3)_3.6H_2O$ (99.5%, Alfa Aesar), with a desired amount of palladium precursor solution and a 0.5M hexamethylenetetramine (HMT), $(CH_2)_6N_4$ (>99%, Alfa Aesar) solution were prepared. After mixing the solutions separately for 30 minutes, the two were combined at room temperature and mixed together for 15 minutes, then the mixture was either kept at room temperature or heated up to 40-85° C. For the zirconia nanoparticles, a 0.04M zirconium oxydichloride octahydrate, $ZrOCl_2.8H_2O$ (99.9%, Alfa Aesar) solution, to which the desired amount of copper nitrate or palladium precursor had been added, was combined with a 0.5M HMT solution at room temperature after 30 minutes mixing separately. For $Cu—ZrO_2$, the mixture was heated up to 40° C. For $Pd—ZrO_2$, the mixture was heated up to 80° C. The resulting $Pd—CeO_2$ nanoparticles were calcined at 350° C. for 4 hours, the $Pd—ZrO_2$ nanoparticles were calcined at 500° C. for 30 minutes, and the $Cu—ZrO_2$ nanoparticles were generally calcined at 500° C. for 30 minutes as well. All of these calcinations were done in air.

X-ray diffraction data (XRD) was obtained using a Philips XPert instrument with $CuK_{\alpha 1}$ radiation. Particle size calculations were made based on XRD broadening of the (111) peak using the Scherrer equation (Cullity, B. D. & Stock, S. R. *Elements of X-ray Diffraction*, Prentice Hall (2001)). A correction was made to the experimental full-width at half-maximum (FWHM) for instrumental broadening by using the FWHM of micron-sized cerium oxide powder (99.99%, Alfa Aesar). The (111) peak was chosen because this is the lowest index peak and peak broadening due to strain and particle size are most easily separated at low angles (Suryanarayana, C. & Norton, M. G. *X-Ray Diffraction: A Practical Approach*, Plenum Press (1998)).

Transmission electron microscopy (TEM) was performed using a Jeol JEM 100CX operating at 100 kV and was selectively used to check the particle size calculations based on the Scherrer equation. For lattice imaging, morphology investigations, and selected area diffraction (SAD), a Jeol JEM2100F, a high resolution (HR) TEM operating at 200 kV and located at Brookhaven National Laboratory's (BNL's) Center for Functional Nanomaterials (CFN), was employed.

X-ray absorption near edge spectroscopy (XANES) was performed at Pd LIII edge using facilities at BNL's National Synchrotron Light Source, beamline X19A. Data was collected in fluorescence mode, the Si(311) monochromator was set to a step size of 0.2 eV near the absorption edges, and a monochromator settling time of 0.5 s was used. The samples were measured in a helium atmosphere, because the absorption edge energy is low and scattering with air is likely. The $Pd^0$ oxidation state standard was metal foil, the $Pd^{2+}$ standard was palladium nitrate, described above, and the $Pd^{4+}$ standard was ammonium hexachloropalladate (IV) (99.9%, Alfa Aesar).

Results

The palladium contents presented herein are generally the precursor molar atomic percentages relative to the other cations in the lattice, because many of the samples have not yet been tested by ion-coupled plasma/atomic emission spectroscopy (ICP/AES). Likewise, the zirconia contents in the (1-x) $CeO_2$-$xZrO_2$ nanoparticles have not been measured, but these are the estimated actual compositions based on testing of a series of ceria-zirconia nanoparticles prepared in a similar manner.

In a procedure similar to that described above involving cerium nitrate and hexamethylenetetramine, nanoparticles of pure ceria prepared form a bright yellow powder composed of single crystals with a narrow size distribution (Zhang, F. Chan, S.-W. et al. *Applied Physics Letters*, 80(10), 127-129 (2002)). The resulting nanoparticles, moreover, are generally perfect crystallites and are octahedrons or truncated octahedrons in shape (Zhang, F., Jin, Q. et al. *Journal of Applied Physics*, 95(8), 4319-4326 (2004)). The lattice of these particles is expanded with respect to bulk cerium oxide which is attributable to the presence of $Ce^{3+}$ cations (Zhang, F., Wang, P. et al. *Surface Science*, 563(1-3), 74-82 (2004)) and an effective negative Madelung pressure (Perebeinos, V. et al. *Solid State Communications*, 123(6-7), 295-297 (2002)).

When ceria is co-precipitated with palladium at 85° C., the colors of the resulting powders are shades of brown, varying in intensity with palladium content (FIG. 4), rather than the yellow color of pure cerium oxide. In FIG. 4, the sample colors are represented in grayscale, rather than in shades of brown as they appear in the actual reactions. As also shown in FIG. 4, the lattice parameter is seen to increase while the particle size decreases as the palladium content in the precursor increases. For a couple of samples, the true palladium percentage relative to cerium cations (i.e., % Pd/(Pd+Ce)) was determined by ICP and is close to the percentage of palladium salt used in preparing the samples, but not exactly the same (FIG. 4).

Figure 11A:
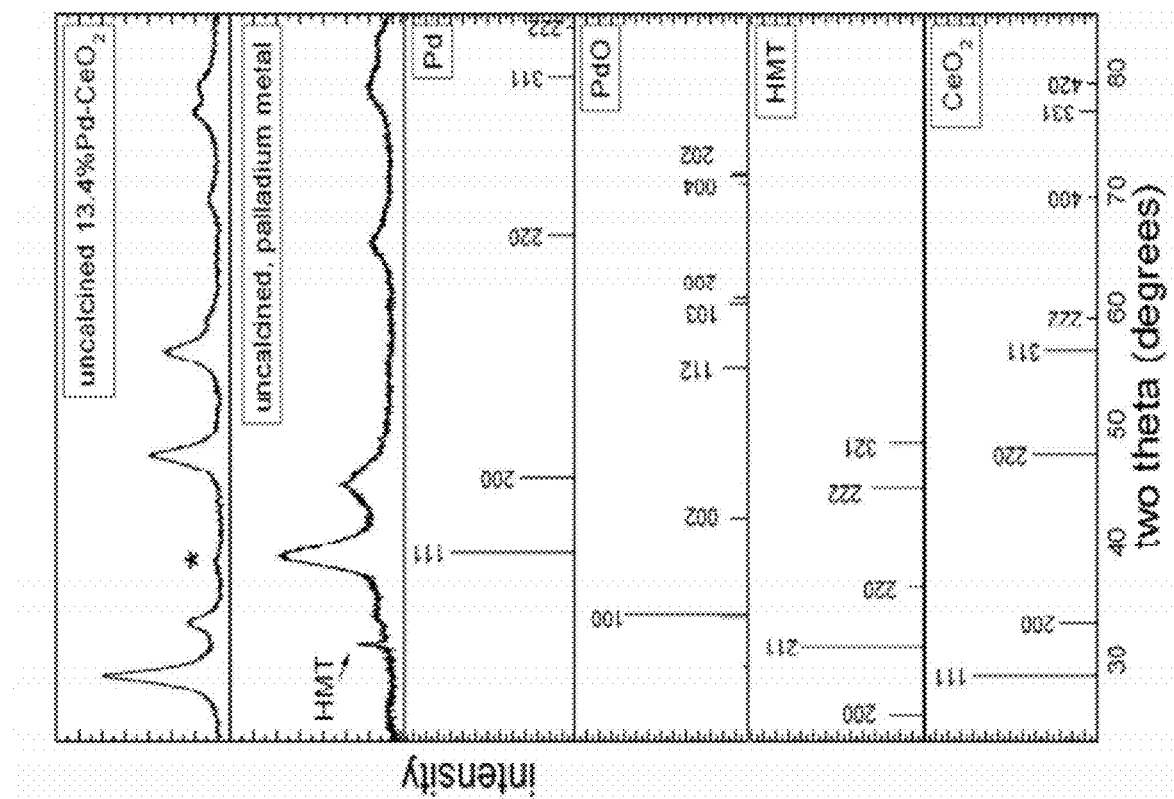
FIG. 11a shows the XRD data for uncalcined nanoparticles of 13.4% Pd—$CeO_2$ and palladium metal and standard powder diffraction data of Pd, PdO, hexamethyltetramine (HMT), and $CeO_2$.

X-ray diffraction data are consistent with cerium oxide, before and after calcination, showing only its characteristic cubic fluorite peaks (FIG. 11; the peaks associated with hexamethylenetetramine, one of the reactants used in preparing the nanoparticles, are indicated by the asterisk (*)). The characteristic peaks of palladium metal, PdO, HMT, and cerium oxide are shown schematically in FIG. 11a. Although all the samples, regardless of Pd content show no sign of Pd-species, there is an increase in inhomogeneous strain as the precursor palladium content increases (FIG. 12) as determined by a Williamson-Hall plot.

Figure 13:
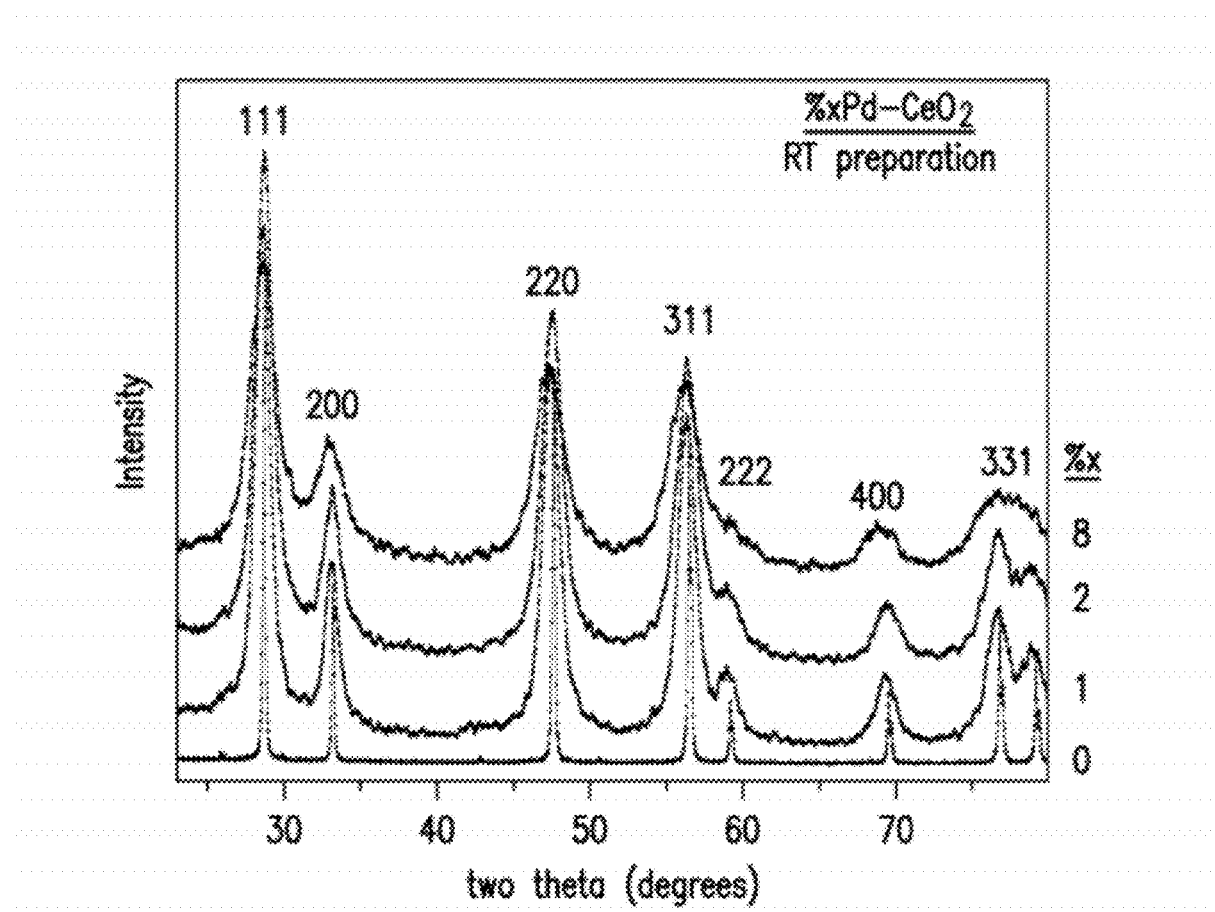
FIG. 13 shows XRD data for calcined xPd—$CeO_2$ precipitated from the combined aqueous solution at room temperature according to one embodiment of the disclosed subject matter, where x is the atomic % Pd in the precursor solution.

Like the nanoparticles precipitated from solution at 85° C., palladium species peaks are absent in samples precipitated at room temperature and subsequently calcined (FIG. 13). These samples, however, are slightly smaller in size (FIG. 5) than the samples precipitated at 85° C.

Figure 14:
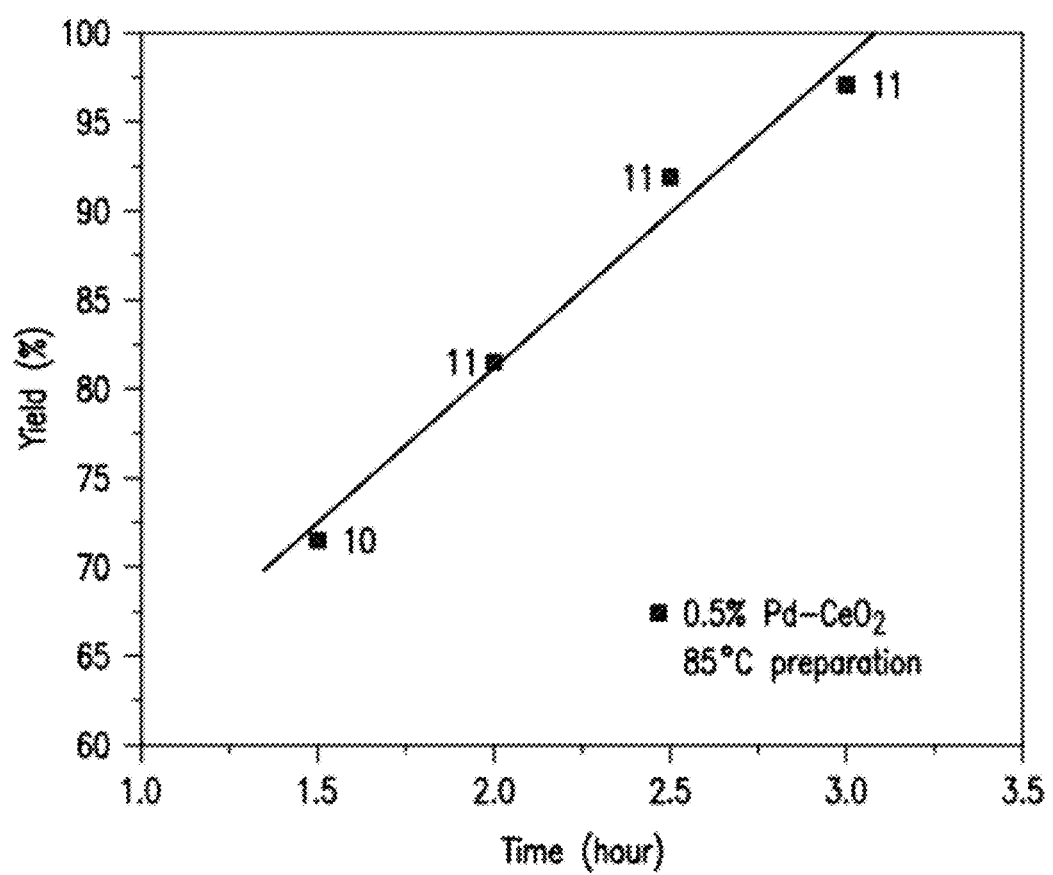
FIG. 14 shows particle yield as a function of reaction time for 0.5% Pd—$CeO_2$ nanoparticles.

The yield of the $Pd—CeO_2$ particles increases as the reaction time increases, but the particle size changes negligibly. For example, for 0.5% $Pd—CeO_2$, the nanoparticle diameter is 10 nm for 1.5 hours reaction and 11 nm for 3 hours reaction (FIG. 14). However, the error in particle size using the Scherrer equation is typically about 1 nm, so this difference is not meaningful.

Transmission electron microscopy shows the pre-calcination sizes to be consistent with calculations based on XRD peak broadening using the Scherrer equation (FIG. 3). Even after calcination at 350° C., the particle size is less than 11 nm.

Figure 23:
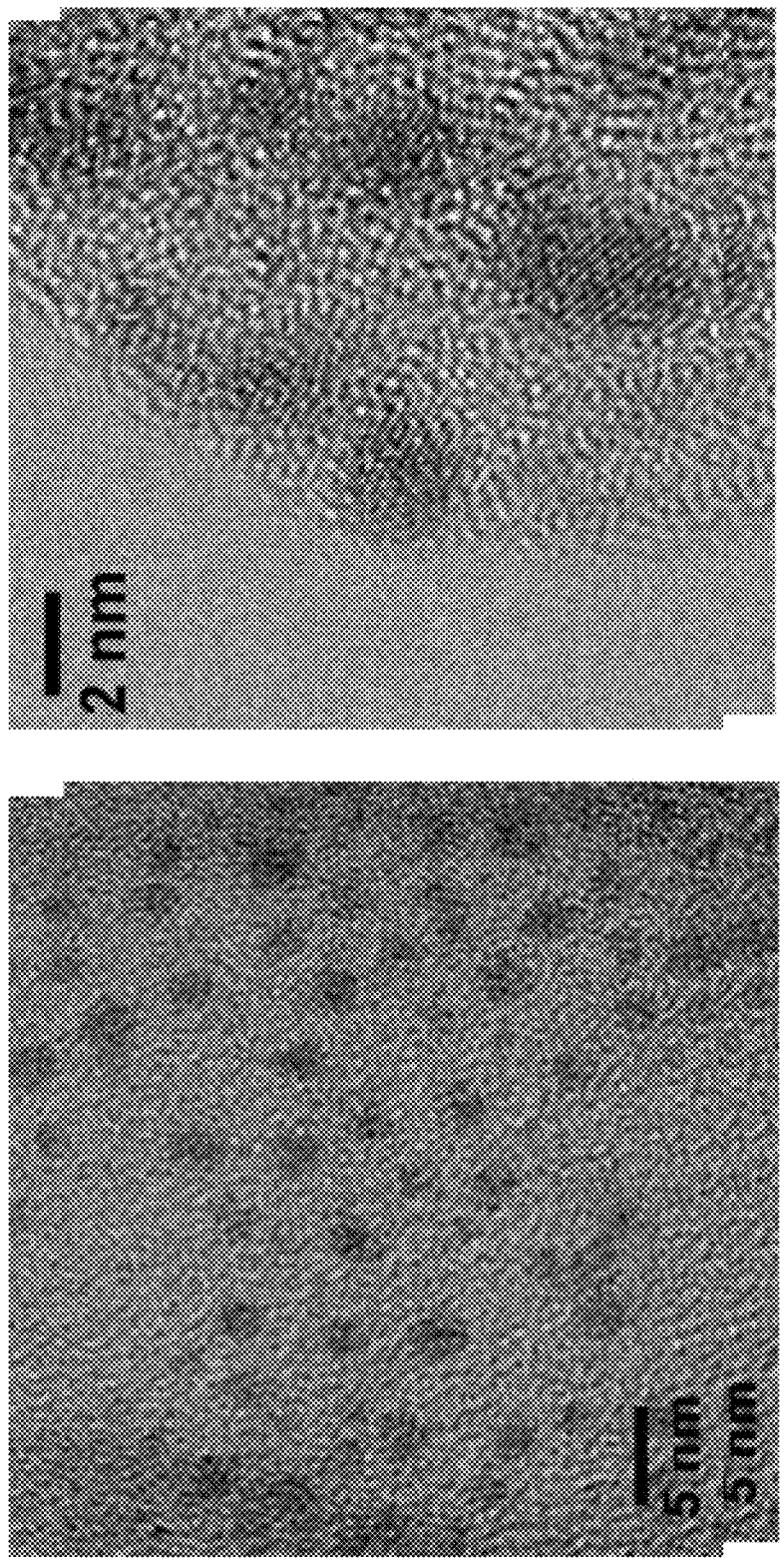
FIG. 23 shows HRTEM images of palladium metal prepared without the addition of cerium nitrate.

The morphology of the resulting nanoparticles is like that of pure ceria, being octahedral in shape, but showing some regions of extended defects (FIG. 6), which are not characteristic of pure ceria as mentioned previously. For purposes of comparison, the same procedure was used in a separate reaction, but no cerium nitrate was used. In this reaction, the mixture was heated initially at 40° C. for 4 hours and then at 85° C. for an additional 2 hours. FIG. 23 shows HRTEM images for the resulting palladium metal nanoparticles using the same amount of palladium as used to produce 13.4% Pd—$CeO_2$ when cerium nitrate is used. The size of these palladium nanoparticles is approximately 2 nm.

Figure 15:
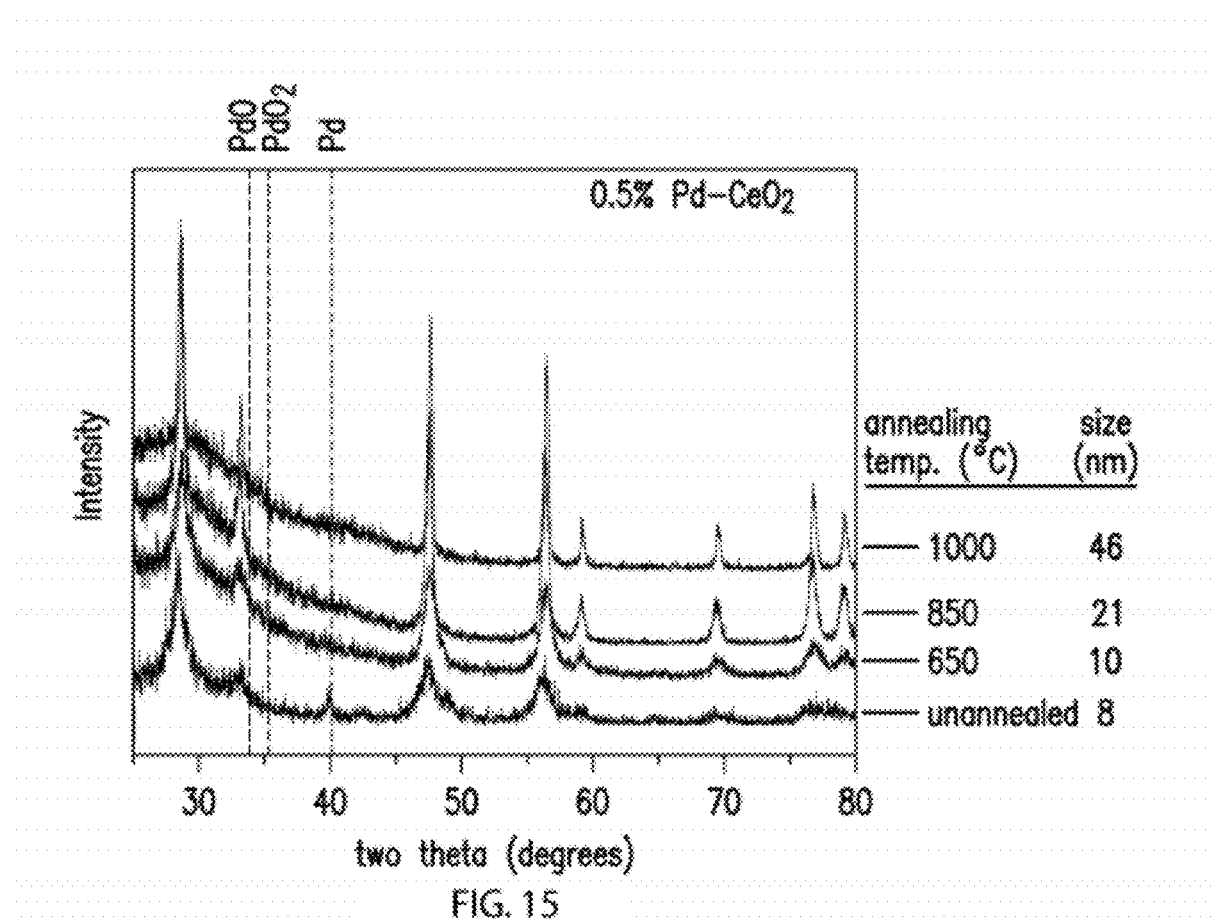
FIG. 15 illustrates the coarsening of 0.5% Pd—$CeO_2$ nanoparticles calcined at various temperatures.
Figure 16:
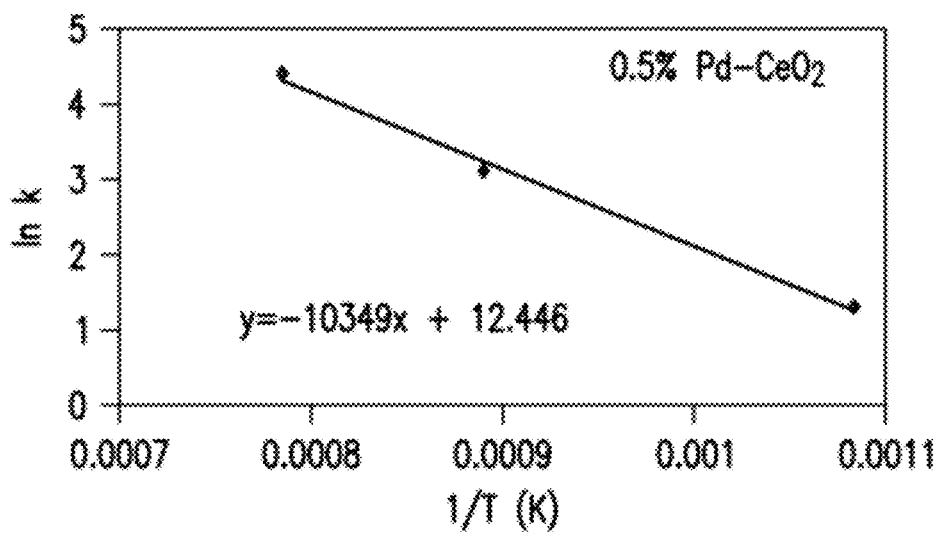
FIG. 16 illustrates the activation energy of coarsening for 0.5% Pd—$CeO_2$ nanoparticles.

When heated above the typical calcination temperature of 350° C., the Pd—$CeO_2$ nanoparticles coarsen. For instance, the 0.5% Pd—$CeO_2$ nanoparticles increase in size from 8 nm when initially precipitated to 46 nm when heated to 1000° C. (FIG. 15). The activation energy for such coarsening was found to be approximately 0.9 eV based on the growth in particle diameter (FIG. 16).

Figure 30:
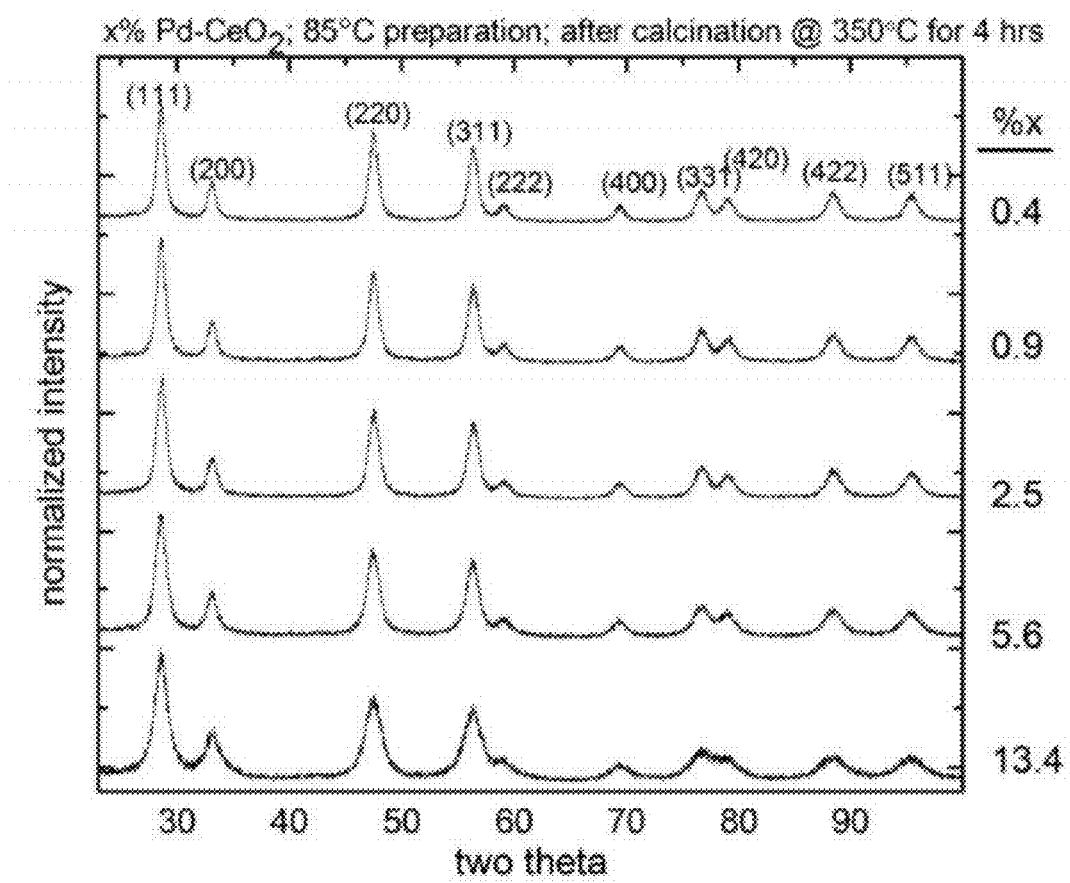
FIG. 30 shows XRD data of calcined xPd—$CeO_2$ nanoparticles precipitated from solution at 85° C. where x is the atomic % Pd in the precursor solution and varies from 0.4% to 13.4%. Only peaks characteristic of cerium oxide are seen and are indexed. Particle size, determined from the (111) XRD peak, is indicated to the right of each diffractogram.

After calcination at 350° C., the XRD data shows only peaks characteristic of cerium oxide. These peaks are shown in FIG. 30.

Figure 17A:
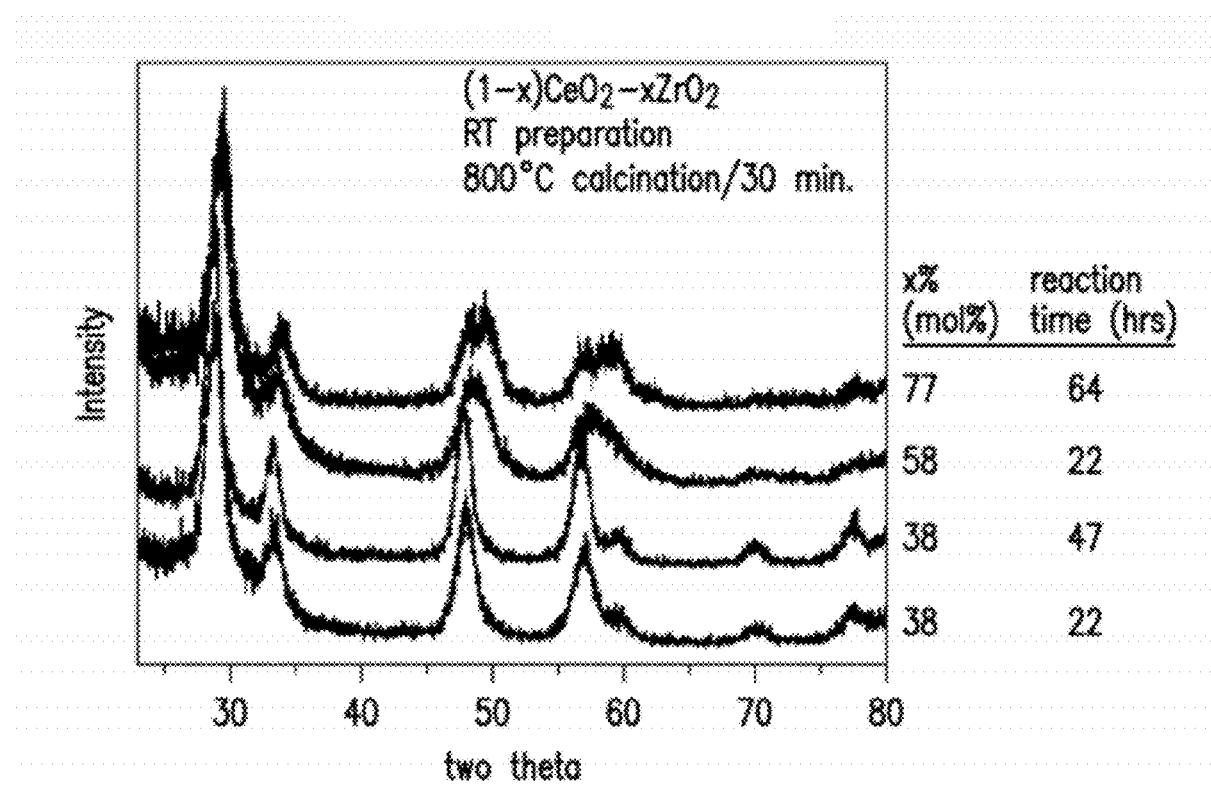
FIG. 17a shows XRD data for nanoparticles precipitated from the combined aqueous solution at room temperature after various aging periods.
Figure 17B:
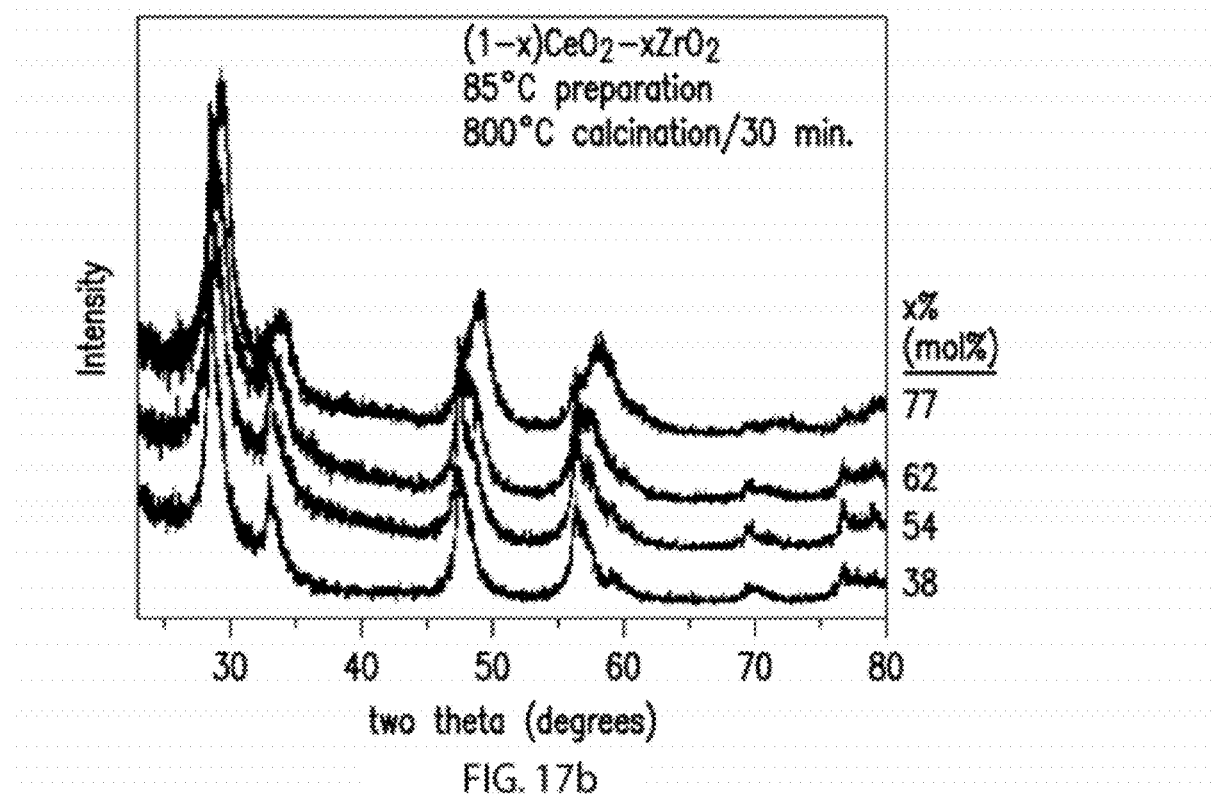
FIG. 17b shows XRD data for nanoparticles precipitated from the combined aqueous solution at 85° C.
Figure 18A:
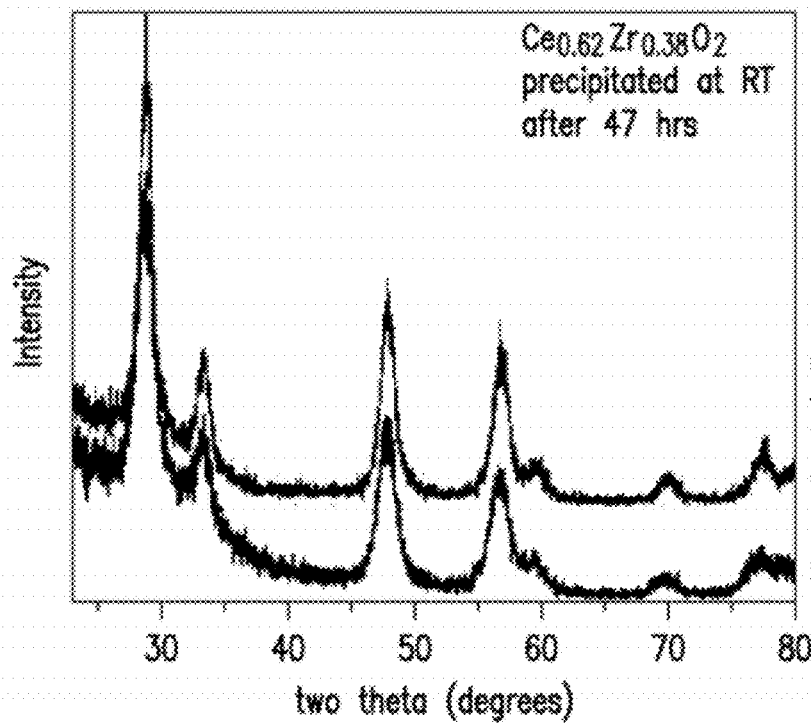
FIG. 18a shows XRD data for $Ce_{0.62}Zr_{0.38}O_2$ nanoparticles.
Figure 18B:
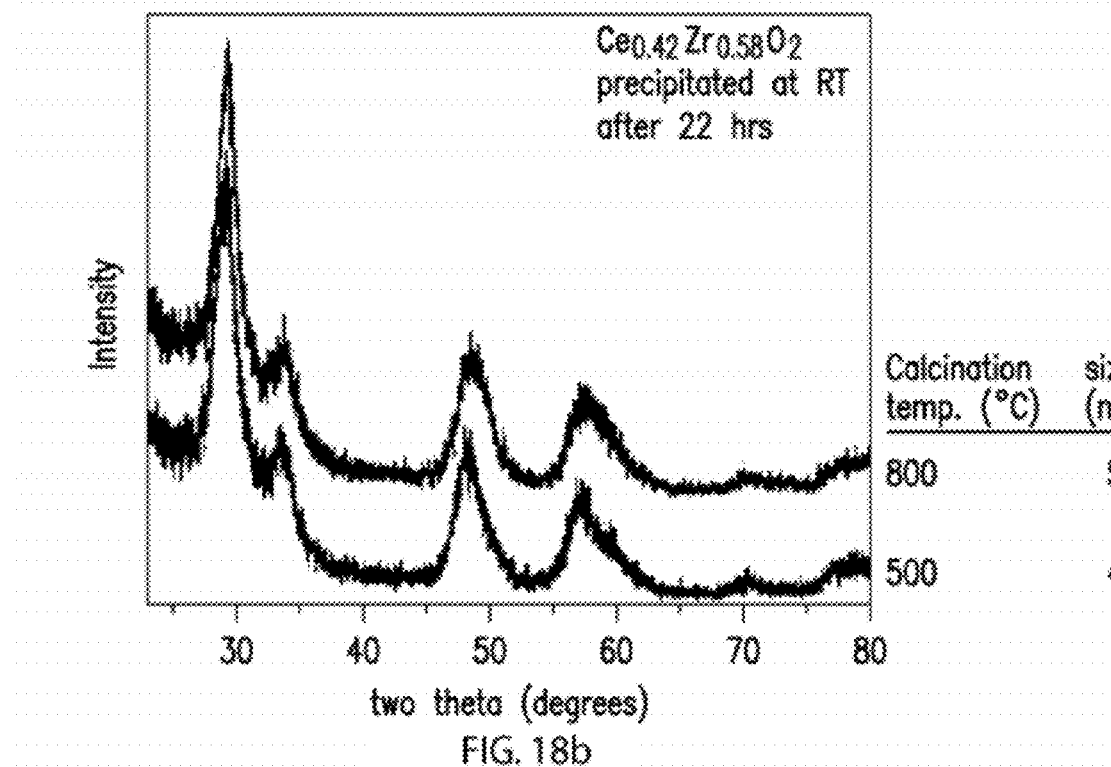
FIG. 18b shows XRD data for $Ce_{0.42}Zr_{0.58}O_2$ nanoparticles.

Ceria-zirconia was also investigated as a promoter for catalysis. For these samples only, the expected zirconia content is reported based on previous ICP data, rather than the precursor content. In these samples, single phase, cubic fluorite nanoparticles were prepared up to approximately 58% zirconia for the nanoparticles precipitated at room temperature regardless of the time allowed for the reaction (FIG. 17a). Samples precipitated at 85° C. can exhibit some phase impurity given the asymmetrical nature of the (220) peak (Si, R. et al. *Journal of Physical Chemistry* C, 111(2), 787-794 (2002)) (FIG. 17b). However, x-ray diffraction data showed little difference in particle size whether initial calcination of the nano-sized powders was accomplished at 500° C. or 800° C. (FIG. 18).

Figure 19A:
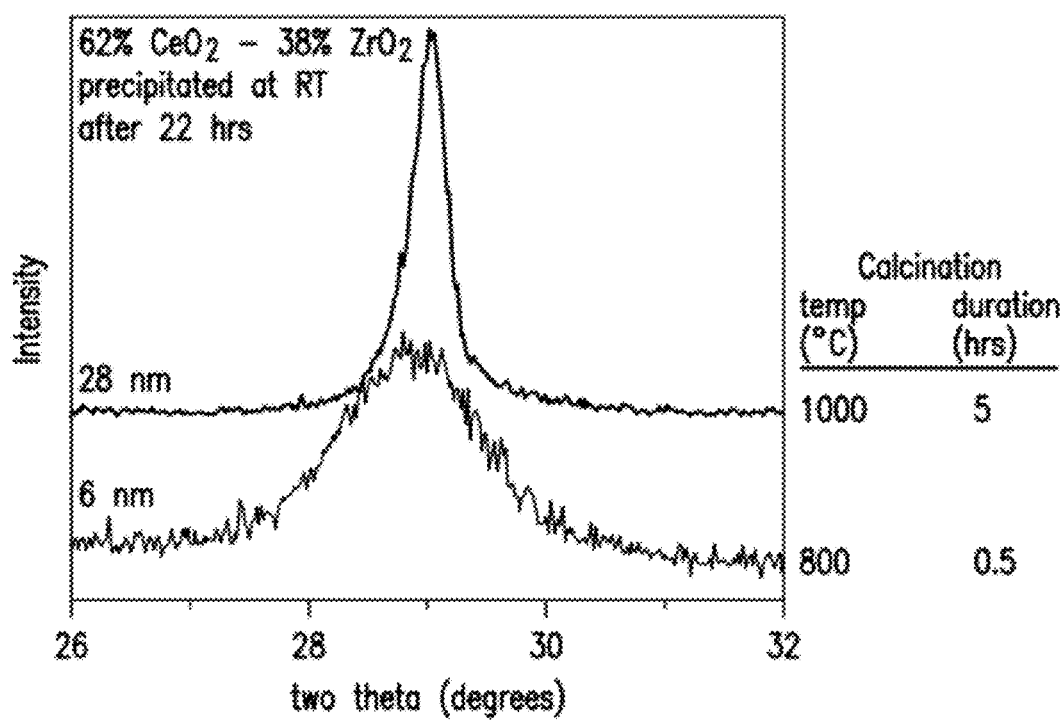
FIG. 19a shows XRD data for $Ce_{0.62}Zr_{0.38}O_2$.

Aging experiments were conducted to assess the homogeneity of the mixed oxides. Phase segregation did occur for ceria-zirconia with 58% zirconia when the samples were calcined for 5 hours at 1000° C. ((b), but if zirconia content is 38% or less, the sample is still a single phase after calcination at 1000° C. for 5 hours (FIG. 19a)). When combined with 1% Pd by weight, 75% $CeO_2$-25% $ZrO_2$ nanoparticles precipitated at room temperature after 22 hours reaction are more resistant to high temperature particle coarsening. These results are summarized in the bottom two rows of FIG. 20; with Pd, the particle size is about 34 nm and without Pd, the size is 41 nm.

Figure 21A:
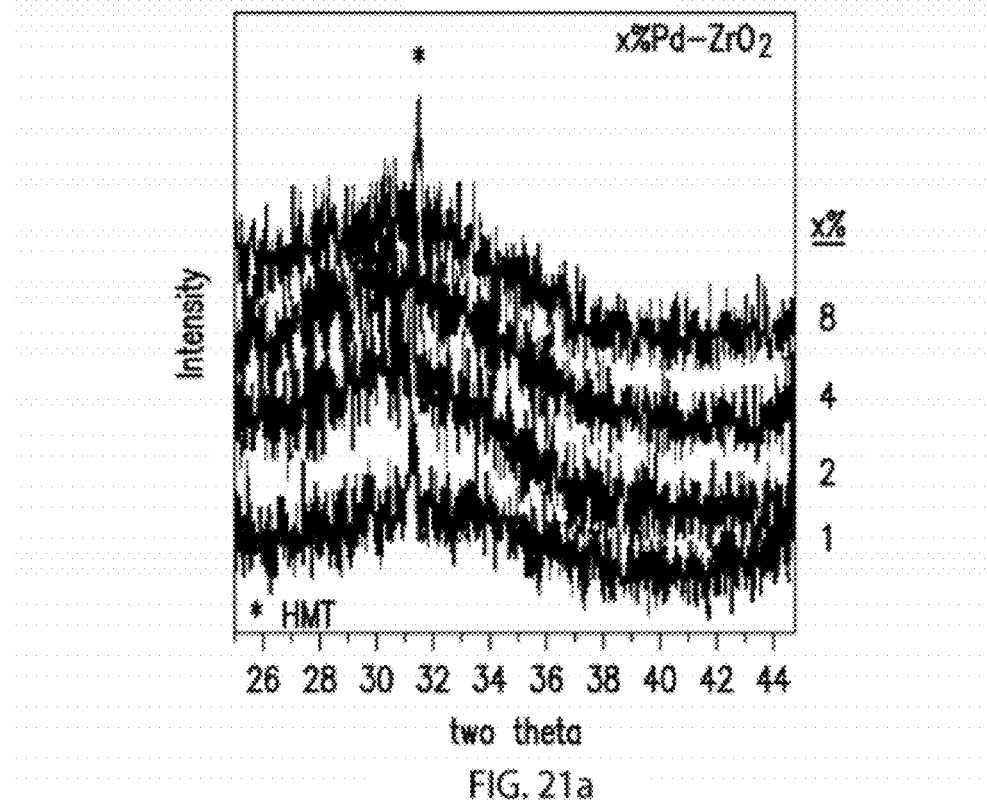
FIG. 21a shows XRD data for uncalcined nanoparticles showing no structure.
Figure 21B:
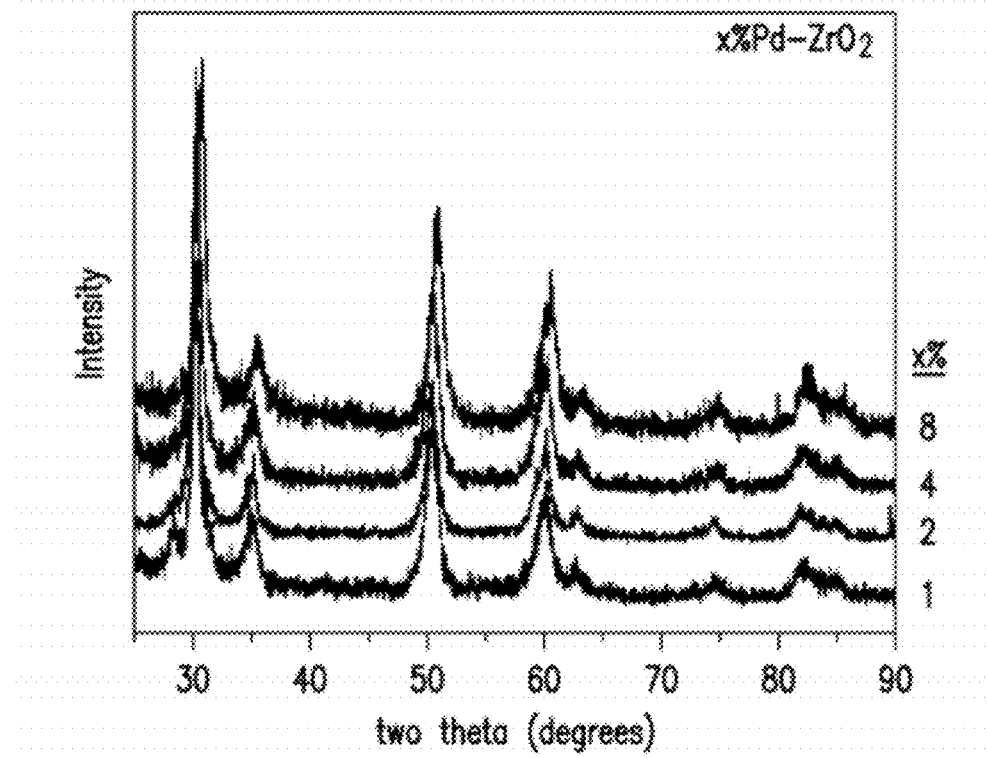
FIG. 21b shows XRD data for calcined nanoparticles showing a cubic fluorite nanostructure.

In addition to studying palladium in combination with pure ceria and ceria-zirconia, palladium was combined with pure zirconia as well. When Pd—$ZrO_2$ is precipitated from solution, the resulting nanoparticles are amorphous (FIG. 21a; a peak associated with HMT is indicated by the asterisk (*)). However, after heating, structurally tetragonal nanoparticles (FIG. 21b) result.

Figure 22A:
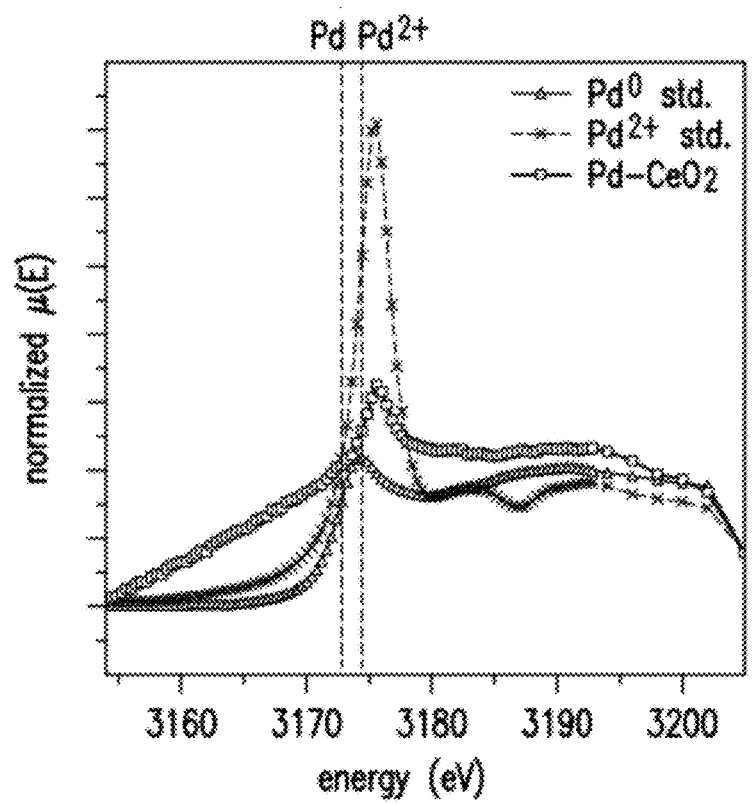
FIG. 22a shows XANES data for the normalized spectra.

The XANES data (FIG. 22) show that palladium is roughly in the +2 oxidation state in Pd—$CeO_2$ nanoparticulate powder based on the position of the maximum in the first derivative of its spectrum relative to that of the $Pd^0$ and $Pd^{2+}$ standards. A more exact calculation of the oxidation state is not possible, because the +4 oxidation state standard, ammonium hexachloropalladate, did not yield a meaningful spectrum. It is possible the powder experienced decomposition under the intense synchrotron beam or strong absorption in the energy range of interest.

Figure 24:
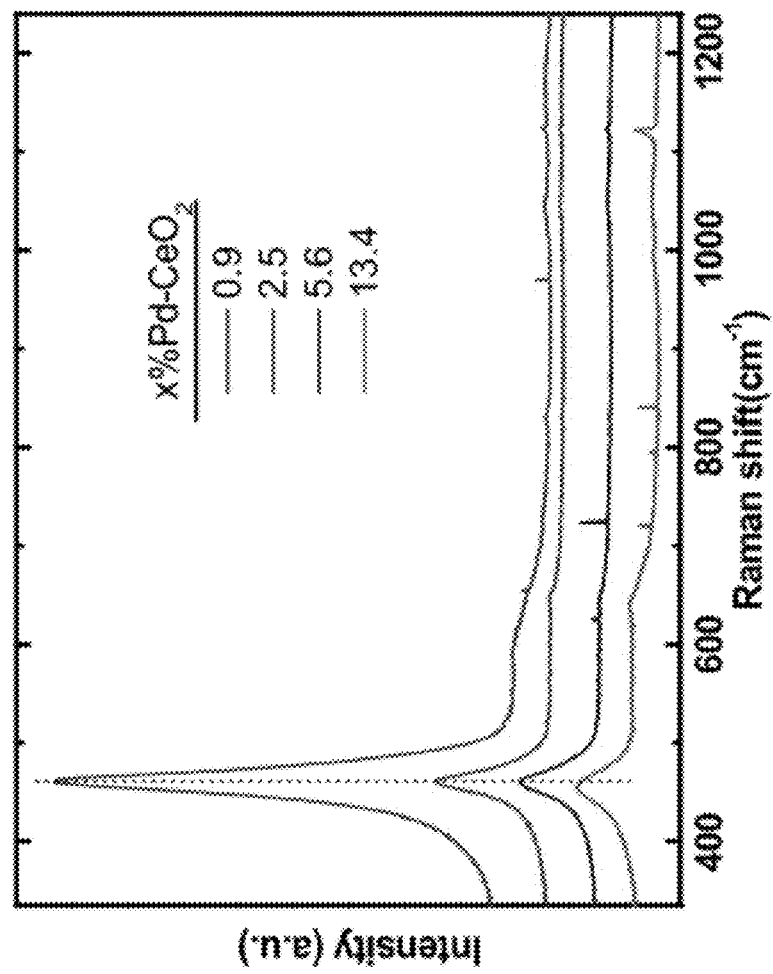
FIG. 24 shows the Raman spectra of Pd—$CeO_2$ nanoparticles with varying palladium contents. The top line shows the Raman spectra for 0.9% Pd—$CeO_2$, followed by the 2.5% Pd—$CeO_2$ and the 5.6% Pd—$CeO_2$. The bottom line represents the Raman spectra for 13.4% Pd—$CeO_2$.
Figure 25A:
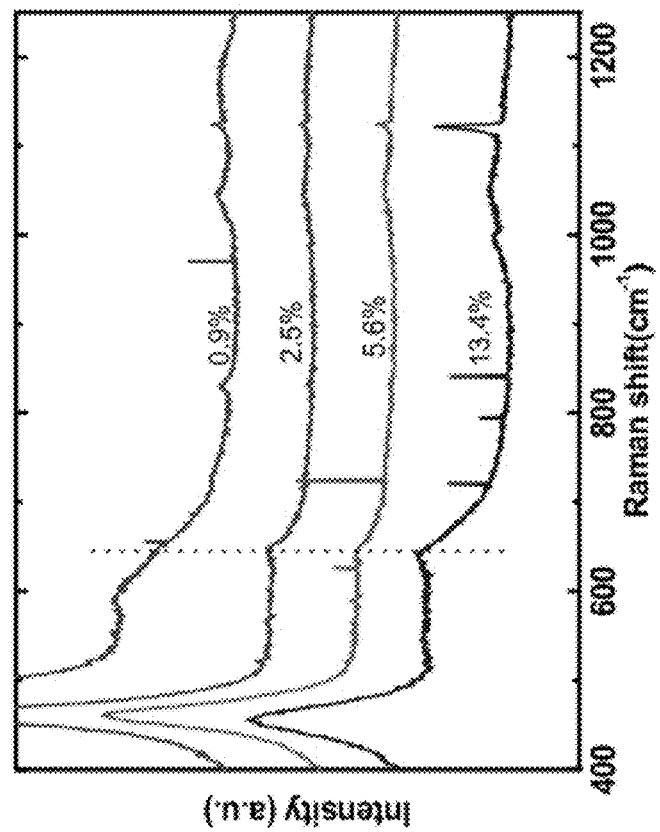
FIG. 25a shows the Raman spectra of FIG. 24 between about 350 cm-1 and 600 cm-1.
Figure 25B:
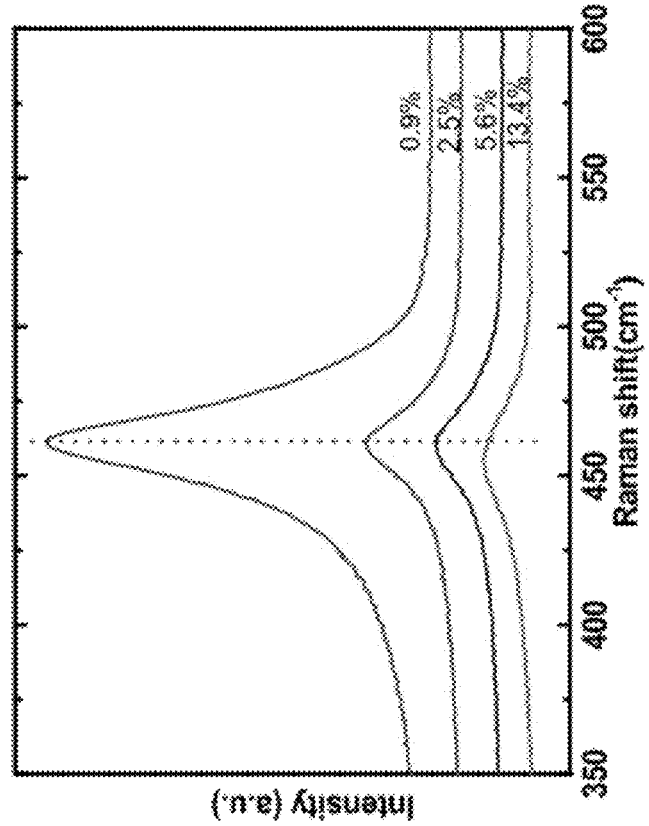
FIG. 25b shows the Raman spectra of FIG. 24 over a more narrow intensity range than is shown in FIG. 24.

Generally, the same Raman peaks are seen throughout the Pd—$CeO_2$ series, as shown in FIG. 31, including the asymmetric, prominent 465 $cm^{-1}$ peak and the broad peak around 600 $cm^{-1}$. In the 13.4% Pd—$CeO_2$ sample, the former peak is shifted to a lower frequency and is much broader than that associated with lower palladium contents. In the 13.4% Pd—$CeO_2$ sample, peaks can also be observed at 640 $cm^{-1}$ and 1122 $cm^{-1}$. FIG. 24 shows a slightly different view of the Raman spectra. FIG. 25 shows a closeup of FIG. 24 at selected frequency ranges.

Figure 26A:
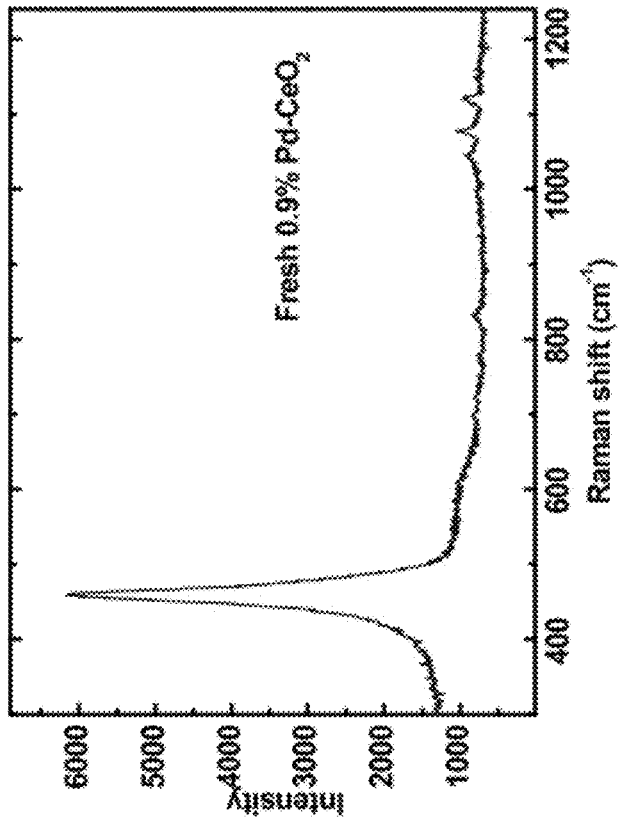
FIG. 26(a) shows the Raman spectra for both the calcined (top) and fresh (bottom) samples.
Figure 26B:
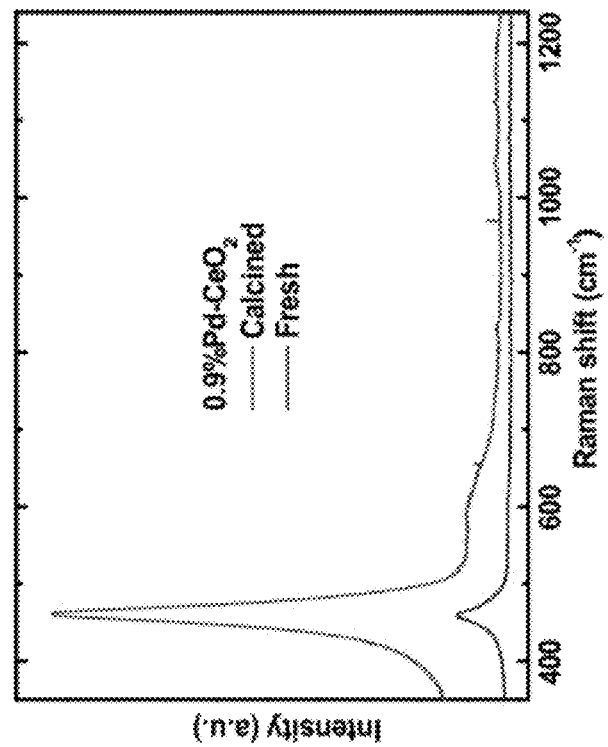
FIG. 26(b) shows a closeup of the Raman spectra for the fresh sample.

The Raman spectra for calcined and fresh samples of 0.9% Pd—$CeO_2$ are shown in FIG. 26. The peak at 465 $cm^{-1}$ corresponds to the $F_{2g}$ vibration of the crystallite $CeO_2$. The broad band at 600 $cm^{-1}$ is associated with oxygen vacancies. The peaks at 830 $cm^{-1}$ and 1120 $cm^{-1}$ are associated with peroxide ($O^{2-}_{ads}$) and superoxide ($O_2^{2-}_{ads}$) species absorbed by the ceria surface, respectively.

Figure 29:
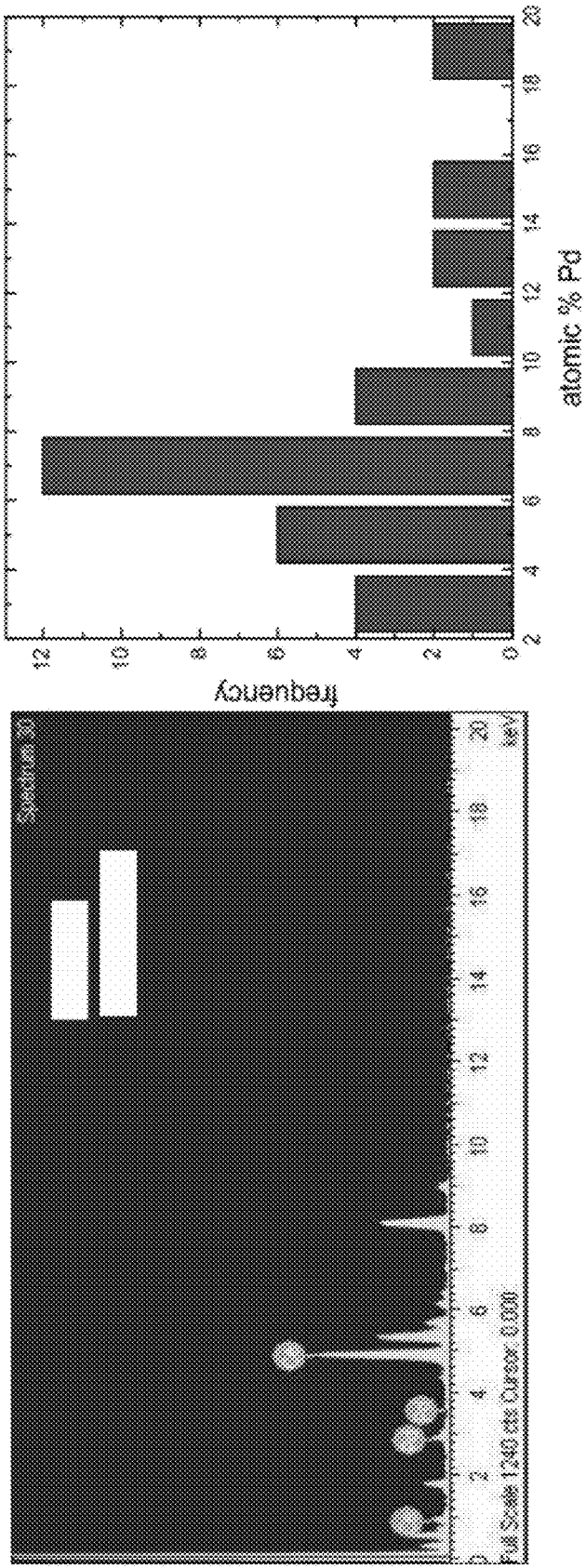
FIG. 29 shows Energy-dispersive X-ray spectroscopy (EDAX) results of 13.4% Pd—$CeO_2$.

When heated above 500° C., the Pd—$CeO_2$ nanoparticles coarsen. The activation energy for such coarsening can be calculated by performing several calcinations with different maximum hold temperatures T, and with different resulting final particle sizes D, as shown in FIG. 27. The calculations in FIG. 27 assume that the exponent of the final and initial grain sizes D and $D_0$ is 1. This parameter, a constant related to growth mechanism, was taken as 1 in Hassanzadeh-Tabrizi et al., *J Alloy Compd* 491:499-502 (2010), which was performed in a similar temperature range. An activation energy of 1.6±0.3 eV was determined for 5.6%, while an activation energy of 0.9±0.2 eV was determined for pure $CeO_2$. According to EDAX measurements of 13.4% Pd—$CeO_2$, shown in FIG. 29, the average Pd atomic concentration is 8%, a little lower than the ICP result.

Discussion

Figure 11B:
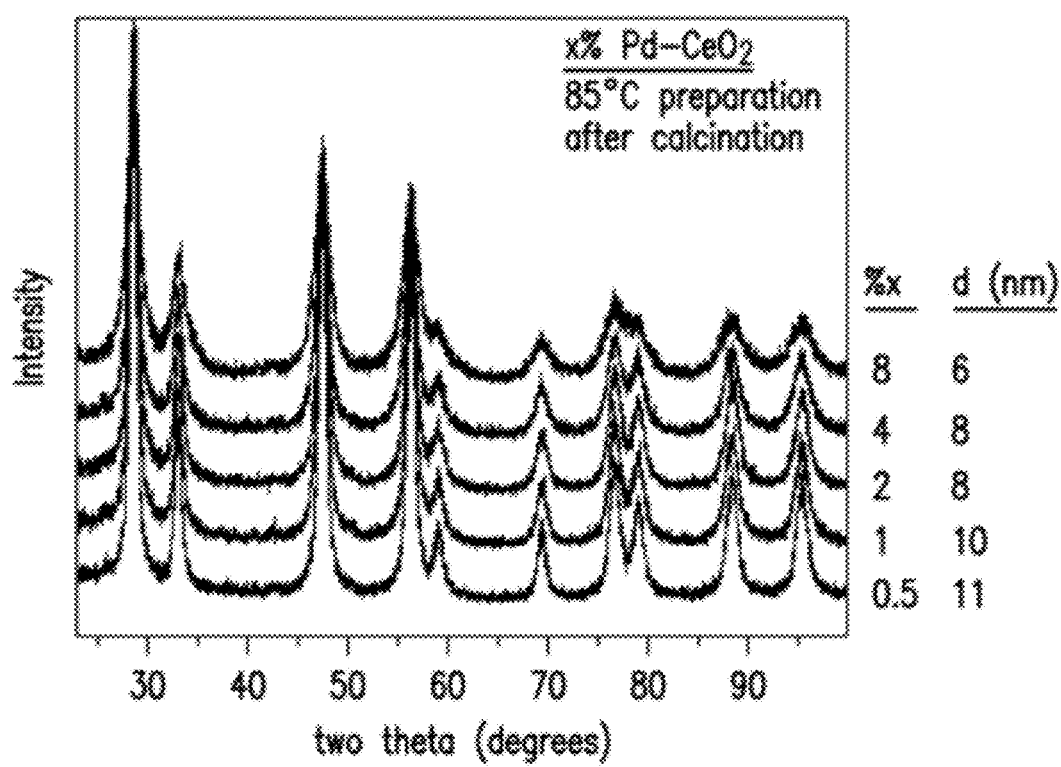
FIG. 11b shows the XRD data for calcined nanoparticles.
Figure 12:
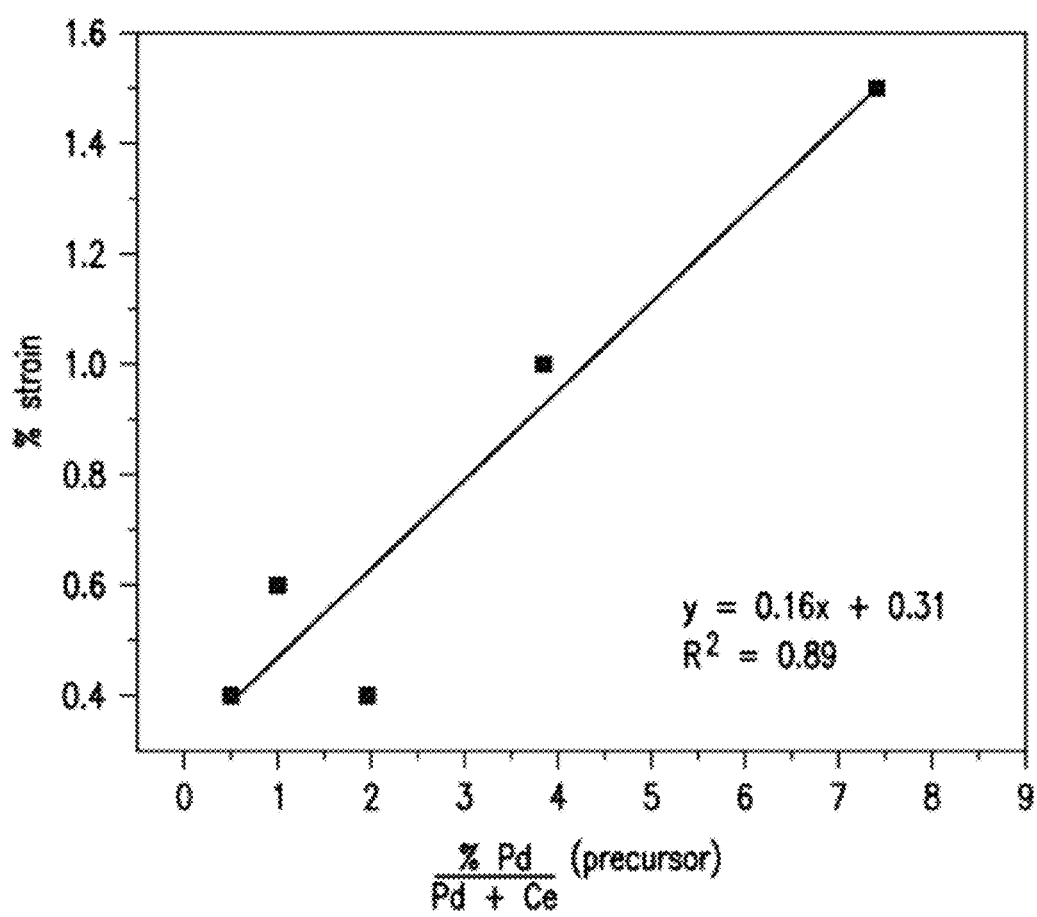
FIG. 12 illustrates the inhomogeneous strain in the lattice of Pd—$CeO_2$ nanoparticles based on the amount of palladium salt used in preparing the nanoparticles.

While not intending to be bound by any particular theory, it is likely that some of the palladium enters the lattice of $CeO_2$, $CeO_2$—$ZrO_2$, and $ZrO_2$. This assertion is partly based on the pre-annealing XRD scan presented in FIG. 11a for Pd—$CeO_2$ nanoparticles, including some minor peaks or peak shoulders that might be attributable to Pd, PdO, or $PdO_2$. It is also based on the subsequent disappearance of any non-ceria peaks (FIG. 11b).

Moreover, the lattice parameter of 8% Pd—$CeO_2$ nanoparticles, provided in FIG. 5, in particular, is much smaller than would be expected for 5 nm particles according to studies on pure nano-ceria (Zhang, Chan et al. (2002)). Such a lattice contraction could be due to the smaller size of $Pd^{2+}$ relative to $Ce^{4+}$ (cation radii of 0.86 Å, and 0.97 Å, respectively (Shannon, R. D. *Acta Crystallographica, A*32, 751-767 (1976)). Since the coordination of $Ce^{4+}$ in the ceria lattice is eight-fold (Mogensen, M. et al. *Solid State Ionics, Diffusion & Reactions,* 129(1-4), 63-94 (2000)), the radii given here for $Pd^{2+}$ is for the cation in six-fold coordination, the maximum coordination for which data is available in the Shannon tables (Shannon (1976)). However, such a high coordination number is possibly unrealistic, and if palladium's true coordination is less than six-fold, the radii of $Pd^{2+}$ would be even smaller. While the 5 nm particle size of the 8% Pd—$CeO_2$ nanoparticles, calculated using the Scherrer equation, is likely artificially depressed by peak broadening attributable to inhomogeneous lattice strain (FIG. 12) rather than wholly attributable to nano-dimensions, this effect is weakest in the lowest index peak (i.e., the (111) peak). Moreover, such strain is not unexpected in a system involving cations with dissimilar radii and is further evidence of solid solution formation.

It is not possible to rule out that some of the Pd is amorphous. In that case, it would not be detectable by XRD. It is also possible that some of the palladium, while actually crystalline, is segregated to the nanoparticle surface in small clusters. Such clusters might not be visible above the noise level due to XRD peak broadening. For example, in a related system, copper contents less than 15% in ceria are routinely not observed in XRD scans (Qi, X. & Flytzani-Stephanopoulos, M. *Industrial and Engineering Chemistry Research*, 43(12), 3055-3062 (2004)). The absence of Pd-related XRD peaks suggests at the very least that the Pd-species are well-dispersed (Overbury, S. H. et al. *Catalysis Letters*, 51, 133-138 (1998)), a positive quality for catalysis, since CO adsorption should increase with an increase in Pd sites (Monteiro, R. S. et al. *Catalysis Today*, 65(1), 77-89 (2001)) and gas adsorption is a first step in heterogeneous catalysis (Heck, R. M. & Farrauto, R. J. *Catalytic Air Pollution Control: Commercial Technology* (2d ed.), Wiley-Interscience (2002)).

Such segregation of palladium from the cerium oxide lattice is supported by studies of ceria doped with $Cu^{2+}$, a cation that like $Pd^{2+}$, is smaller than $Ce^{4+}$. In the case of $Cu$—$CeO_2$, the two cation radii are too different in size to allow the oxides to be completely mutually soluble (Groza, J. R. & Gibeling, J. C. *Materials Science and Engineering A, A*171(1-2), 115-125 (1993)), and copper monolayer formation appears to occur as copper content is increased based on copper activity in ceria extrapolated from electromotive force (emf) measurements (Knauth, P. et al. *Journal of Solid State Chemistry*, 140(2), 295-299 (1998)). Such dopant segregation would lower the effective dopant concentration in the bulk of the grains (Tschope, A. *Journal of Electroceramics*, 14, 5-23 (2005)) and could explain the fact that the lattice parameter of a sample like 8% Pd—$CeO_2$, although lower than pure ceria, is not low enough according to an empirical formula provided by Kim (Kim, D.-J. *Journal of the American Ceramic Society*, 72(8), 1415-1421 (1989)) that predicts fluorite lattice parameter as a function of dopant radius and valence. That is, keeping in mind that the so-called 8% Pd—$CeO_2$ has an actual Pd content of 13.38%, as determined by ICP, the lattice parameter of the resulting solid solution could be as low as about 5.36 Å (assuming 6-fold coordination for Pd), whereas it is 5.42 Å according to FIG. 4. While Kim's formula assumes 8-fold coordination and some (Consentino, I. C. & Muccillo, R. *Materials Letters*, 48, 253-257 (2001)) dispute the accuracy of the Kim formulas for ceria, the discrepancy is large enough to call into question the formation of a complete solid solution between palladium cations and cerium oxide.

Regardless of the extent of solid solution formation between ceria and palladium, it is clear that the palladium present in the nanoparticles is ionic, rather than metallic. Palladium is in the +2 state (FIG. 22) as has been observed elsewhere for Pd-ceria (Monteiro et al. (2001); Iglesias-Juez, A. et al. Applied Catalysis A: General, 259(2), 207-220 (2004)). Moreover, the XANES measurements of oxidation state presented here are often more accurate than XPS measurements, because the extreme vacuum of an XPS system can induce unwanted reduction of the oxide (Zhang, Wang et al. (2004)).

Figure 19B:
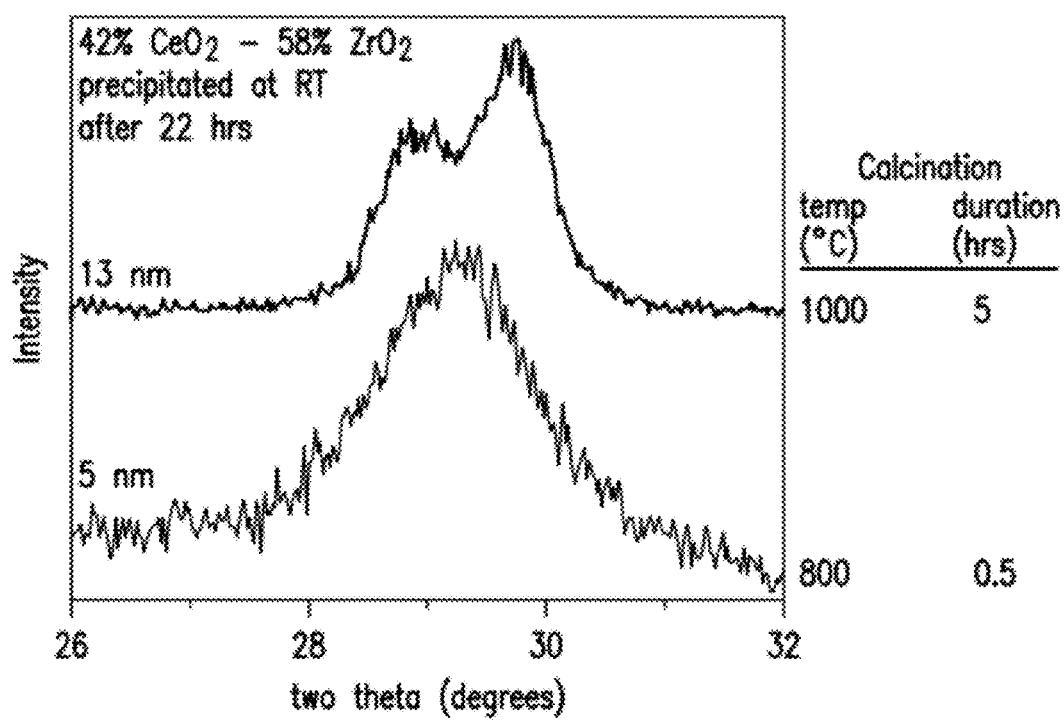
FIG. 19b shows XRD data for $Ce_{0.42}Zr_{0.58}O_2$.

For the $CeO_2$—$ZrO_2$ aging experiments, the heating protocol adopted has been previously suggested (Di Monte, R. D. & Kaspar, J. *Journal of Materials Chemistry*, 15, 633-648 (2005)). When a zirconia content of 58% is reached, phase separation occurs (FIG. 19*b*) during aging at 1000° C., but such separation is not observed in the 38% samples (FIG. 20*a*). A stable ceria-zirconia nanoparticulate sample with 38% $ZrO_2$ is desirable, because the reducibility of any of these mid-composition samples is much improved relative to pure ceria (Di Monte & Kaspar (2005)).

The Pd—$ZrO_2$ nanoparticles are structurally tetragonal (FIG. 21*b*), although all the peaks cannot be clearly resolved. This assessment is based on the asymmetry of the (200) and (121) peaks. As was alluded above, such peak asymmetry has been used to assess phase purity (Si et al. (2002); Monte & Kaspar (2005)). Stabilization of tetragonal zirconia at room temperature, which is inconsistent with the bulk phase diagram (Ruh, R. et al. *Journal of the American Ceramic Society*, 51(1), 23-28 (1968)), is likely made possible by the lower surface energy of tetragonal zirconia than monoclinic zirconia (Pitcher, M. W. et al. *Journal of the American Ceramic Society*, 88(1), 160-167 (2005)), where the latter is the usual room-temperature structure of zirconia, and the greater importance of surface energy in such nanoparticle systems.

Figure 22B:
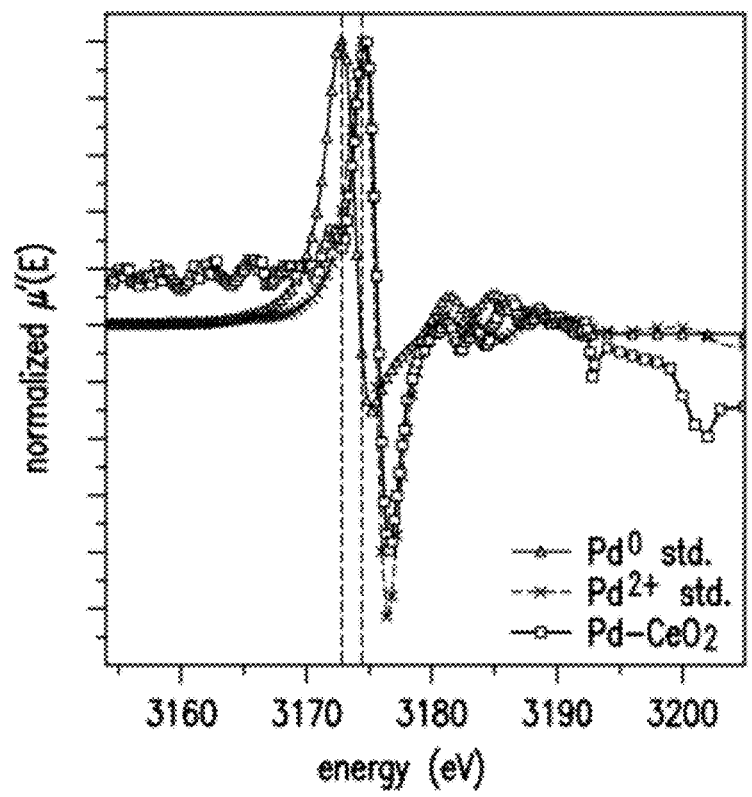
FIG. 22b shows XANES data for the first derivative of the spectrum showing the position of the standard's absorption edges as dashed lines.

Although formation of cubic zirconia has been achieved under reducing annealing conditions (Lu et al. (2008)), it is difficult to prepare for powders anneal in air, because oxygen vacancies tend to be found (Zhang, F., Chupas, P. J. et al. *Chemistry of Materials*, 19(13), 3118-3126 (2007)) when this high temperature polymorph is prepared below its normal stable temperature range of 2370-2690° C. (Ruh et al. (1968)). The same is likely true of tetragonal zirconia by extension. It is also probable that the presence of palladium assisted in the stabilization of the tetragonal phase, because at the lowest palladium content in FIG. 21*b*, a peak at 28.3 degrees associated with the monoclinic phase of zirconia, is visible. However, such a peak cannot clearly be resolved in the 4% and 8% palladium sample (FIG. 22*b*). One study has shown that tetragonal zirconia can exhibit high stability and selectivity to hydrogen production, when combined with nickel (Benito, M. et al. *Journal of Power Sources*, 169(1), 167-176 (2007)).

CONCLUSIONS

Nanoparticles of Pd—$CeO_2$, Pd—$CeO_2$—$ZrO_2$, and Pd—$ZrO_2$ have been prepared with sizes of 12 nm or less after calcination. Palladium species in these particles are undetectable by XRD and some evidence of solid solution formation has been found. Palladium clearly exists in the +2 state in these samples, based on XANES data.

The foregoing merely illustrates the principles of the disclosed subject matter. Various modifications and alterations to the described embodiments will be apparent to those skilled in the art in view of the teachings herein. Features of existing methods can be seamlessly integrated into the methods of the exemplary embodiments of the disclosed subject matter or a similar method. It will thus be appreciated that those skilled in the art will be able to devise numerous methods and compositions which, although not explicitly shown or described herein, embody the principles of the disclosed subject matter and are thus within its spirit and scope.

Various publications, patents, and patent applications are cited herein, the contents of all of which are hereby incorporated by reference in their entireties

What is claimed is:

1. A nanoparticle prepared by:
    (a) combining a solution consisting of hexamethylenetetramine (HMT) with a solution comprising a noble metal support solution to form a preliminary aqueous solution;
    (b) heating said preliminary aqueous solution;
    (c) combining said preliminary aqueous solution with a palladium salt to form a combined aqueous solution; and
    (d) mixing said combined aqueous solution to produce a nanoparticle.

2. The nanoparticle of claim 1, wherein said preliminary aqueous solution is heated to between about 48° C. and about 85° C.

3. The nanoparticle of claim 1, wherein said nanoparticle has a high defect density.

* * * * *